US011335347B2

(12) United States Patent
Aguilar Alas et al.

(10) Patent No.: US 11,335,347 B2
(45) Date of Patent: May 17, 2022

(54) MULTIPLE CLASSIFICATIONS OF AUDIO DATA

(71) Applicant: Amazon Technologies, Inc., Seattle, WA (US)

(72) Inventors: Gustavo Alfonso Aguilar Alas, Houston, TX (US); Viktor Rozgic, Belmont, MA (US); Chao Wang, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/429,689

(22) Filed: Jun. 3, 2019

(65) Prior Publication Data

US 2021/0104245 A1    Apr. 8, 2021

(51) Int. Cl.
*G10L 15/26* (2006.01)
*G06F 40/284* (2020.01)
*G10L 15/06* (2013.01)
*G10L 15/16* (2006.01)

(52) U.S. Cl.
CPC ........... *G10L 15/26* (2013.01); *G06F 40/284* (2020.01); *G10L 15/063* (2013.01); *G10L 15/16* (2013.01)

(58) Field of Classification Search
CPC ....... G10L 15/26; G10L 15/063; G10L 15/16; G06F 40/284
See application file for complete search history.

(56) References Cited

U.S. PATENT DOCUMENTS

| 8,548,806 | B2* | 10/2013 | Nagashima | G10L 15/32 |
| | | | | 704/251 |
| 8,676,586 | B2* | 3/2014 | Wasserblat | G10L 25/48 |
| | | | | 704/270 |
| 9,619,980 | B2* | 4/2017 | Cruz-Hernandez | G06F 3/016 |
| 10,134,425 | B1* | 11/2018 | Johnson, Jr. | G10L 15/05 |
| 10,210,861 | B1* | 2/2019 | Arel | G10L 15/063 |
| 2006/0122834 | A1* | 6/2006 | Bennett | G10L 15/30 |
| | | | | 704/256 |
| 2008/0228480 | A1* | 9/2008 | Maegawa | G10L 15/07 |
| | | | | 704/235 |
| 2010/0169159 | A1* | 7/2010 | Rose | G06Q 30/0278 |
| | | | | 705/7.29 |
| 2012/0016671 | A1* | 1/2012 | Jaggi | G10L 15/22 |
| | | | | 704/235 |
| 2013/0297310 | A1* | 11/2013 | Weinstein | G10L 15/005 |
| | | | | 704/243 |

(Continued)

FOREIGN PATENT DOCUMENTS

WO    2017218243 A2    12/2017

OTHER PUBLICATIONS

International Search Report and Written Opinion dated Sep. 16, 2020 for International Patent Application No. PCT/US2020/034862.

(Continued)

*Primary Examiner* — Mohammad K Islam
(74) *Attorney, Agent, or Firm* — Pierce Atwood LLP

(57) ABSTRACT

Described herein is a system for sentiment detection in audio data. The system is trained using acoustic information and lexical information to determine a sentiment corresponding to an utterance. In some cases when lexical information is not available, the system (trained on acoustic and lexical information) is configured to determine a sentiment using only acoustic information.

18 Claims, 18 Drawing Sheets

(56) References Cited

U.S. PATENT DOCUMENTS

| | | | |
|---|---|---|---|
| 2014/0112556 A1* | 4/2014 | Kalinli-Akbacak | ............................ G06K 9/00302 382/128 |
| 2014/0236600 A1* | 8/2014 | Lu | ........................ G10L 15/063 704/251 |
| 2015/0019214 A1* | 1/2015 | Wang | ...................... G10L 15/34 704/232 |
| 2015/0095026 A1* | 4/2015 | Bisani | .................... H04R 3/005 704/232 |
| 2015/0302850 A1* | 10/2015 | Lebrun | .................... G06F 40/35 704/243 |
| 2016/0042226 A1* | 2/2016 | Cunico | .................. G06N 5/022 382/103 |
| 2016/0086599 A1* | 3/2016 | Kurata | .................... G10L 15/19 704/243 |
| 2016/0322043 A1* | 11/2016 | Bellegarda | .............. G10L 15/08 |
| 2016/0379632 A1* | 12/2016 | Hoffmeister | ............ G10L 25/87 704/253 |
| 2017/0256254 A1* | 9/2017 | Huang | .................... G10L 15/02 |
| 2017/0270919 A1* | 9/2017 | Parthasarathi | .......... G10L 15/02 |
| 2018/0032611 A1* | 2/2018 | Cameron | ............... G06K 9/723 |
| 2018/0052842 A1* | 2/2018 | Hewavitharana | ... G06F 16/3329 |
| 2018/0165554 A1* | 6/2018 | Zhang | .................. G06K 9/6256 |
| 2018/0277098 A1* | 9/2018 | Min | ..................... G06K 9/6262 |
| 2018/0308487 A1* | 10/2018 | Goel | ....................... G10L 15/26 |
| 2019/0130931 A1* | 5/2019 | Costa | ...................... G10L 21/10 |
| 2019/0189115 A1* | 6/2019 | Hori | ....................... G10L 15/02 |
| 2019/0244601 A1* | 8/2019 | Rusak | ..................... G10L 15/08 |
| 2019/0266998 A1* | 8/2019 | Liang | .................... G10L 15/142 |
| 2020/0065384 A1* | 2/2020 | Costello | ............... G06N 3/0454 |
| 2020/0066251 A1* | 2/2020 | Kumano | ................. G10L 13/00 |
| 2020/0298873 A1* | 9/2020 | Provost | ................... G10L 15/16 |
| 2020/0335092 A1* | 10/2020 | Georgiou | ............... G06N 20/00 |
| 2020/0342896 A1* | 10/2020 | Kanai | ................ G06K 9/00302 |

OTHER PUBLICATIONS

Zhou, Suping, et al. "Emotion Inferring from Large-Scale Internet Voice Data: A Multimodal Deep Learning Approach", 2018 First Asian Conference on Affective Computing and Intelligent Interaction (ACII Asia), May 20, 2018, pp. 1-6.

Eesung, Kim, et al. "DNN-Based Emotion Recognition Based on Bottleneck Acoustic Features and Lexical Features", 2019 IEEE International Conference on Acoustics, Speech and Signal Processing, May 21, 2019, pp. 6720-6724.

International Preliminary Report on Patentability dated Dec. 16, 2021 for International Patent Application No. PCT/US2020/034862.

* cited by examiner

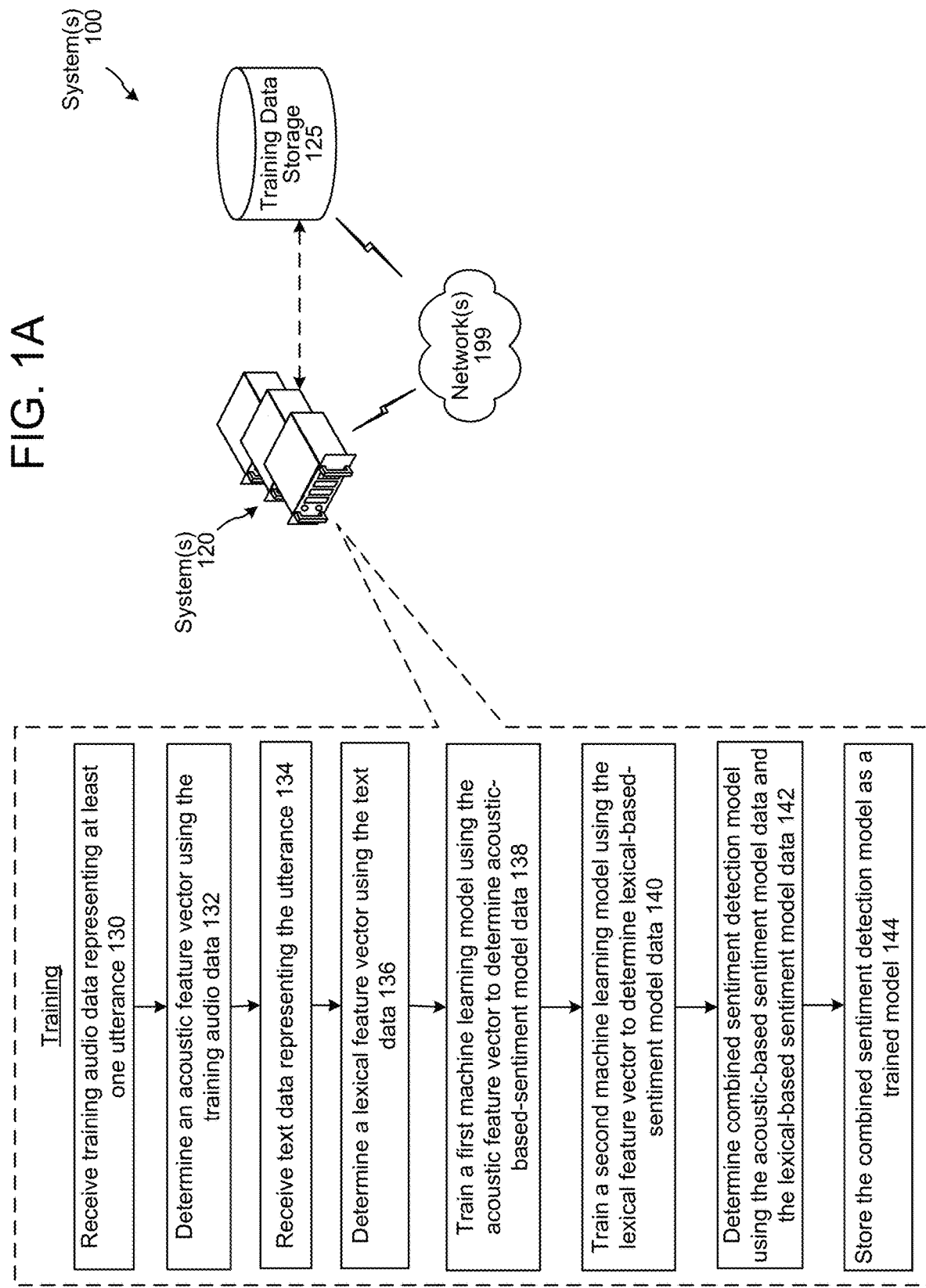

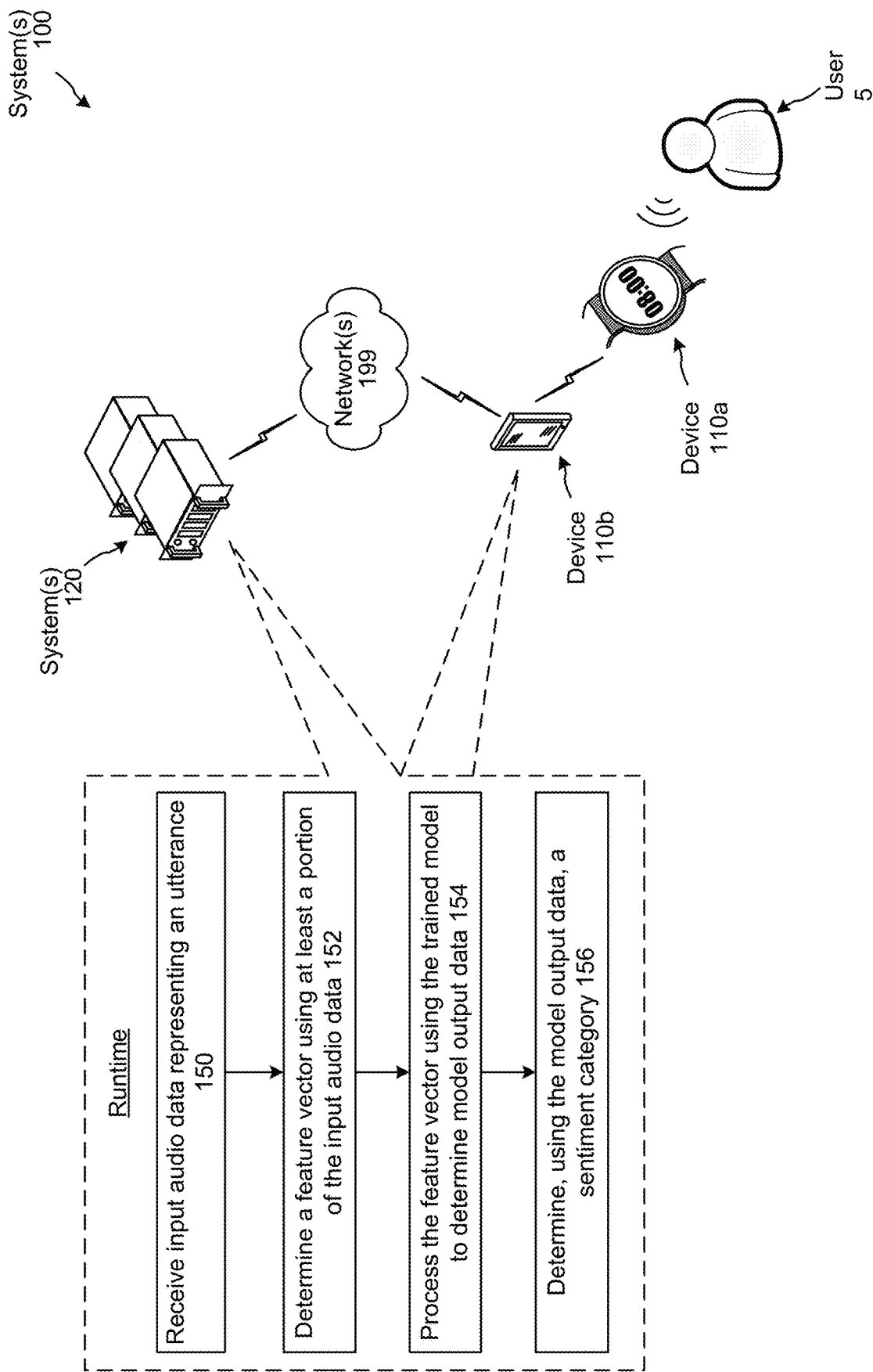

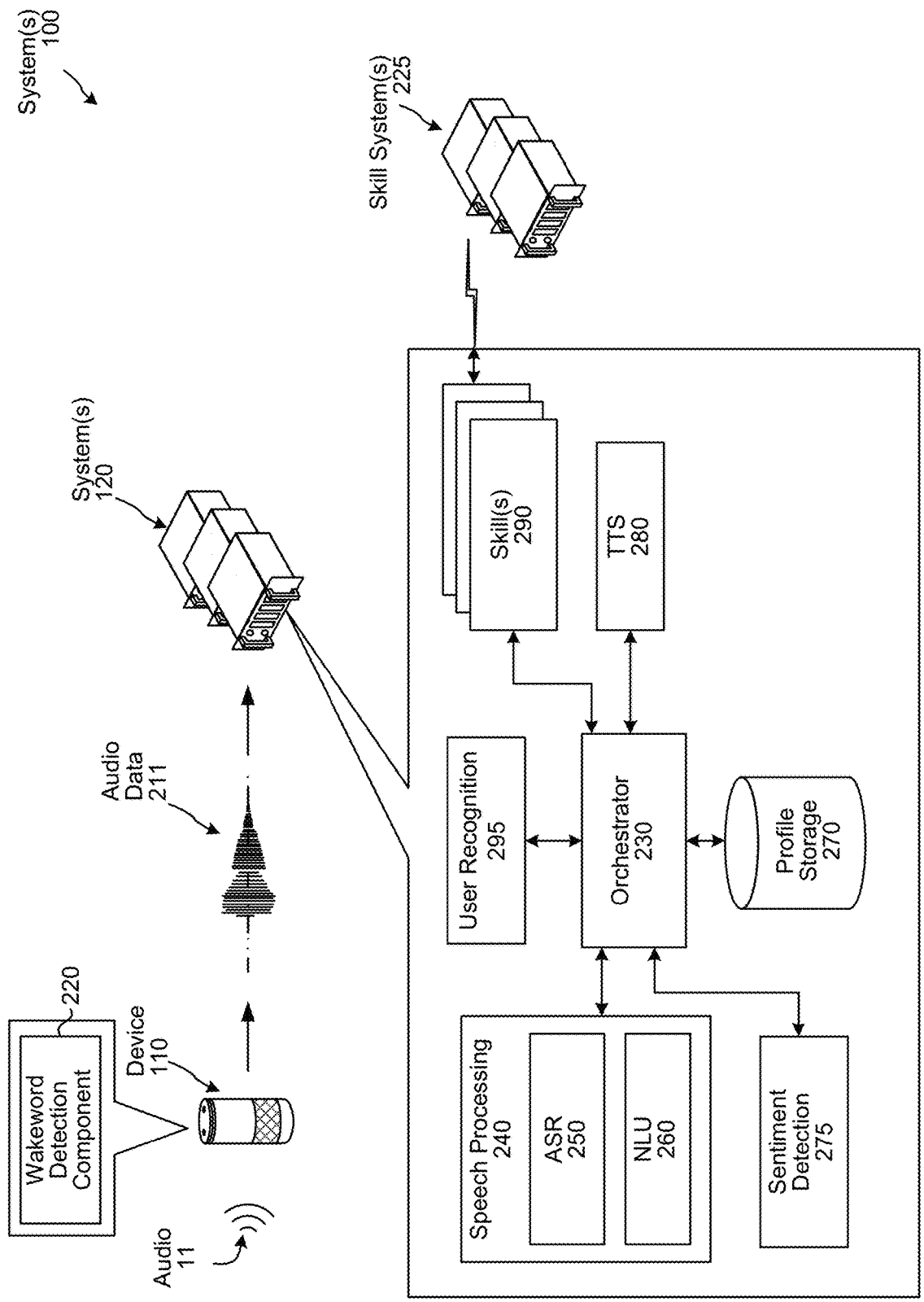

MULTIPLE CLASSIFICATIONS OF AUDIO DATA

BACKGROUND

Speech recognition systems have progressed to the point where humans can interact with computing devices using their voices. Such systems employ techniques to identify the words spoken by a human user based on the various qualities of a received audio input. The audio input may also indicate an emotion or sentiment of the user when speaking the words.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to train a system for detecting sentiment in audio data according to embodiments of the present disclosure.

FIG. 1B illustrates a system configured to detect sentiment in audio data according to embodiments of the present disclosure.

FIGS. 2A and 2B are conceptual diagrams of speech processing components of a system according to embodiments of the present disclosure.

DETAILED DESCRIPTION

Figure 2B:
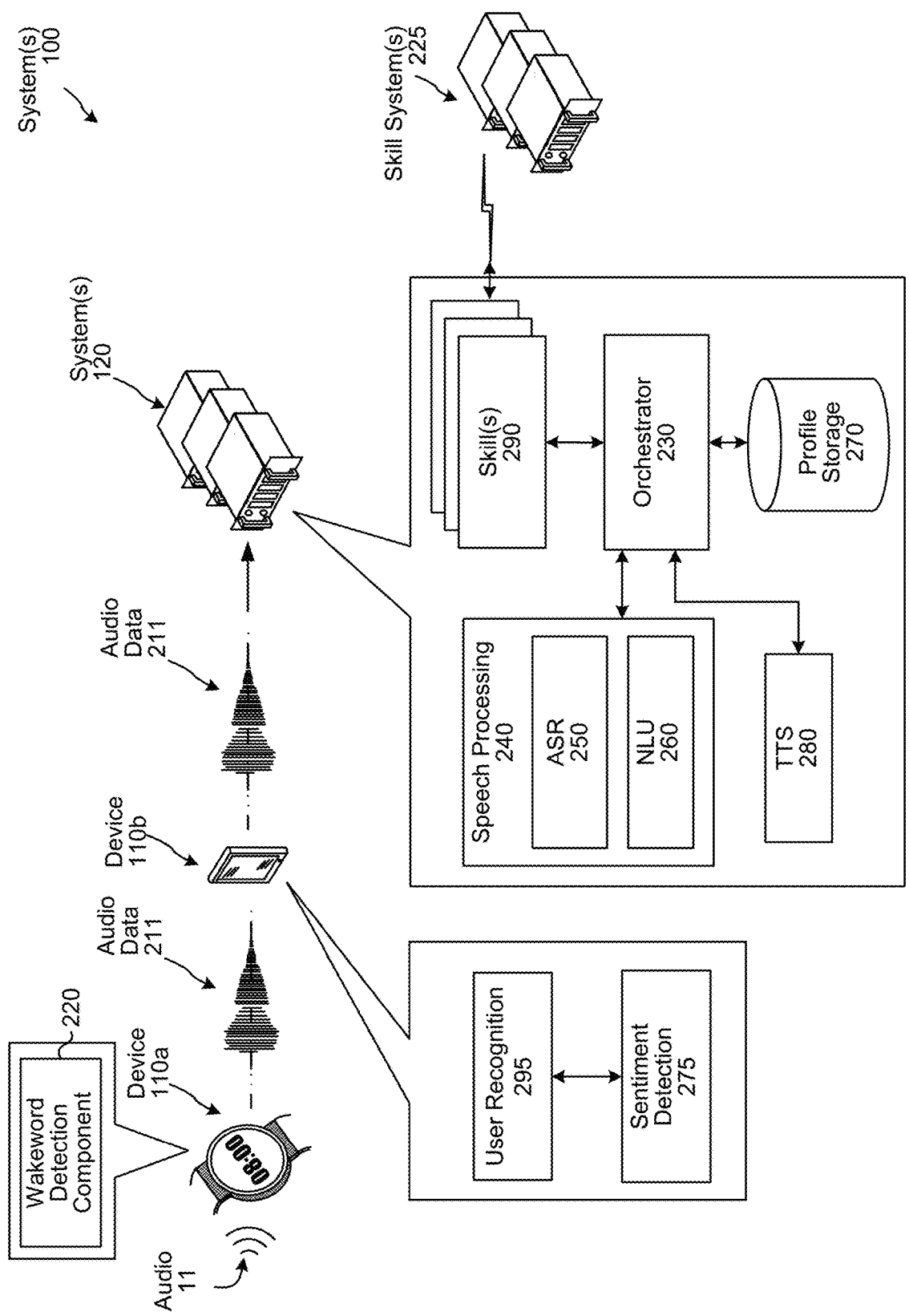

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music," a system may output music. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The present system may be configured to classify audio data including speech from a user, for example, based on emotion, sentiment and/or lexical information derived from the audio data. In some cases, it may be desirable to detect the emotion and/or sentiment of a user speaking to the system. For example, for the user input "Alexa, add an emoji," a system may output an emoji based on the user's emotional state/sentiment, for example the user's emotional state/sentiment detected from the audio data of the user input (e.g., the user's tone of voice). In another example, the user may input "Alexa, recommend a movie," and the system may analyze the user's present emotional state/sentiment to recommend a movie corresponding to that emotional state/sentiment. In other examples, the system may analyze speech data during a period of time, and determine a sentiment category at various time intervals to provide the user information on the user's emotional state during the period of time and/or while interacting with other persons. This may be helpful for a user to track personal emotional state and/or sentiment over a period of time, or for another user (e.g., a doctor, a psychologist, etc.) to track a patient's emotional state and/or sentiment over a period of time. In another example the system may analyze speech data while the user interacts with a device, and the sentiment category may indicate the user's satisfaction with his or her interactions with the device. The system detecting an emotional state of the user may refer to the system analyzing the tone of the user's voice in an acoustic signal. The system detecting a sentiment of the user may refer to the system analyzing the user's word choices.

The system may incorporate user permissions and may only perform sentiment detection activities disclosed herein if approved by a user, and may configure sentiment detection per the user permissions/preferences. For example, the system may perform sentiment detection on the user's speech only. As such, the systems, devices, components, and techniques described herein may restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. The system may delete all data relating to sentiment detection after a period of time and/or after the audio data has been analyzed and output has been presented and/or viewed by the user. The user may also request the system to delete all data relating to sentiment detection. The system may limit access to data relating to sentiment detection according to the user permissions selected by the user.

The systems and methods described herein relate to sentiment detection using audio data. The system combines lexical and acoustic information to provide a robust and more accurate sentiment detection system. Lexical information refers to information derived from the meaning of words or the semantic meaning of the words in a sentence. Acoustic information refers to information derived from the audio data corresponding to the spoken utterance. For example, in the utterance "I am angry," the system uses the lexical information indicated by the word "angry" to detect an emotion of anger. For the same utterance, the audio data may indicate the speaker's voice rising in pitch and/or volume, and the system also uses this acoustic information to detect a sentiment of anger. In some cases, the lexical information corresponding to an utterance may not be readily available for example due to computational complexity and/or privacy-related constraints with respect to the ASR output. The system described herein combines acoustic and lexical modalities during training while configuring a deployable lexical-independent acoustic model. In other embodiments, the system provides a model that processes acoustic and lexical information during runtime to determine a user's sentiment.

The sentiment detection system described herein may process input audio data to determine if the audio data includes voice activity from a human user (e.g., speech). Then the system may identify portions of the input audio data that represents speech from a particular user. The portions of the input audio data may be processed using a trained machine learning (ML) model to predict a sentiment category for the audio data. The sentiment category may be used in various applications. For example, the sentiment category may be displayed to a user to indicate his or her sentiments during interactions with other persons, and/or to indicate his or her sentiment during particular times of the day. The sentiment category may also be used by application developers for voice-activated systems or smart speaker systems to identify emotions and/or sentiments of a user while interacting with the voice-activated system or smart speaker system. The application developer may be able to determine a user's satisfaction of his or her interactions with the voice-activated system or smart speaker system. Assuming user permission, other components may also receive sentiment data for different operations.

In an example embodiment, a user may be wearing or otherwise carrying a device that detects audio data and initiates analysis of the audio data when voice activity is detected. The user may configure the device to monitor his or her speech interactions with other persons throughout the day. The sentiment detection system may determine an emotional state of the user for various interactions, and generate a periodic report for the user. The report may be stored and/or may be displayed to the user, such as on a wearable device, phone, tablet, or other device.

The system may be configured to determine a speaker's sentiment/emotional state for an utterance. The system is configured to determine a sentiment category (e.g., happiness, sadness, neutral, anger, etc.) corresponding to an utterance using acoustic information and lexical information. For example, some words may represent a particular sentiment because of their meaning, which is represented by the lexical information corresponding to the words, while some words may represent a particular emotion because of the way they are spoken by the user, which is represented by the acoustic information corresponding to the words. The acoustic information may be derived from the audio data received by the system, however, in some cases, the lexical information may not be readily available. The system described herein may be trained on both acoustic and lexical information, and is configured to, during runtime, determine a sentiment corresponding to an utterance using only acoustic information. The system may be configured to use contextual information from the entire utterance to determine an overall sentiment of the speaker for an utterance. The system may also use information conveyed by individual words in the utterance to determine the sentiment of the speaker for the utterance. Although the present application describes the system as determining a sentiment category, it should be understood that a sentiment category may refer to a classification of the audio data based on the sentiment and/or the emotional state of the user.

FIG. 1A illustrates a system 100 configured to train a system to detect sentiment in audio data according to embodiments of the present disclosure. FIG. 1B illustrates a system 100 configured to detect sentiment in audio data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1A, the system 100 may include one or more system(s) 120 in communication with a training data storage 125. As illustrated in FIG. 1B, the system 100 may include a device 110 local to a user 5, and one or more systems 120 connected across one or more networks 199. The device 110*a* may be in communication with device 110*b*. As illustrated, the processes described with respect to FIG. 1A may be performed during training operations (when the system 100 is configured to detect a sentiment in audio data) and processes described with respect to FIG. 1B may be performed during runtime operations (when the configured system 100 processes input audio data to detect a sentiment).

As shown in FIG. 1A, the system(s) 120 receives (130) training audio data representing at least one utterance. The system(s) 120 may be in communication with training data storage 125 directly or via network(s) 199. Training data may be stored in the training data storage 125 and may include the training audio data representing speech/utterances spoken by different persons and expressing a variety of sentiments. The training data may include labels, annotations or indications indicating a sentiment corresponding to each audio frame (e.g., data structure representing some duration of audio, such as 25 ms), each word in an utterance, and/or each utterance in the training data.

The system(s) 120 determines (132) at least one acoustic feature vector using the training audio data. A portion of the training audio data may be inputted into an encoder 1050 (described further in relation to FIG. 10) to determine a corresponding acoustic feature vector. The acoustic feature vector may represent audio frame level features extracted from a portion of the training audio data. In an example embodiment, an acoustic feature vector may represent features extracted for a window of 25 ms of audio, where the window slides or moves in increments of 10 ms to extract features stored as the next acoustic feature vector. In other embodiments, one acoustic feature vector may represent features corresponding to an individual word in the utterance. The system(s) 120 may determine the portions of training audio data that correspond to individual words in an utterance and extract features from the respective portions of audio using the encoder 1050. For example, a first acoustic feature vector may represent features of a first word of the utterance and a second acoustic feature vector may represent the features of a second word of the utterance. The acoustic feature vectors may be derived by spectral analysis of the training audio data.

The system(s) 120 receives (134) text data representing the utterance. The system(s) 120 determines (136) at least one lexical feature vector using the text data. The ASR component 250, as described below, may generate an ASR output including text data representative of an utterance represented in the training audio data. In some embodiments, the system sends a portion of the training audio data to the ASR component 250 for processing. The ASR output may be represented as feature vectors, for example lexical feature vectors, where each feature vector may correspond to a word in the text data determined by the ASR component 250 and may represent semantic/lexical information of the word as presented in the utterance. For example, a first lexical feature vector may represent features of the first word of the utterance and a second lexical feature vector may represent the features of the second word of the utterance. The lexical feature vector may be a word embedding such as embeddings described below.

The system(s) 120 trains (138) a first machine learning (ML) model using the acoustic feature vector to determine acoustic-based-sentiment model data. The system(s) 120 trains (140) a second machine learning (ML) model using the lexical feature vector to determine lexical-based-sentiment model data. The system(s) 120 may perform operations 138 and 140 in parallel. The system(s) 120 trains two ML models focused on different modalities. For example, the first ML model is trained to process acoustic features derived from the training audio data, while the second ML model is trained to process lexical features derived from text data corresponding to the training audio data.

The system(s) 120 determines (142) a combined sentiment detection model using at least a portion of the acoustic-based-sentiment model data and at least a portion of the lexical-based-sentiment model data. The system(s) 120 may update the acoustic-based-sentiment model data (weights, parameters, etc. of the first ML model) using information (model data, weights, parameters) learned while training the second ML model on lexical data. The system(s) 120 may use cross-entropy loss values/functions to update the acoustic-based-sentiment model data. For example, the system(s) 120 may determine a first cross-entropy loss value corresponding to the first ML model and a second cross-entropy loss value corresponding to the second ML model. The system(s) 120 may determine a third loss value based on comparing the first and second loss values. The system(s) 120 may update the acoustic-based-sentiment model data using the second cross-entropy loss corresponding to the second (lexical) ML model and the third loss value.

The system(s) 120 stores (144) the combined sentiment detection model as a trained model configured to detect sentiments in audio data. By updating the acoustic-based-sentiment model data using a portion of the lexical-based-sentiment model data, the system(s) 120 configures the trained model to infer some semantic and/or lexical information even though during runtime it only processes acoustic features.

The operations 130, 132, 134, 136, 138, 140, 142 and 144 may be performed during training of a ML model to detect sentiment in audio data. Further details of these operations are described in connection with FIG. 6. The training operations are performed prior to runtime to determine the trained model to detect sentiment in audio data. The models trained during the operations discussed with regard to FIG. 1A may be used during runtime evaluation to determine sentiment information.

During runtime, as shown in FIG. 1B, system(s) 120 receives (150) input audio data representing an utterance. The system(s) 120 determines (152) a feature vector using at least a portion of the input audio data. A portion of the input audio data may be inputted into an encoder 1050 (described further in relation to FIG. 10) to determine a corresponding feature vector. The feature vector may represent audio frame level features extracted from the portion of the input audio data. In an example embodiment, a feature vector may represent features extracted for a window of 25 ms of audio, where the window slides or moves in increments of 10 ms to extract features stored as the next acoustic feature vector. In other embodiments, one feature vector may represent features corresponding to an individual word in the utterance. The system(s) 120 may determine the portions of input audio data that correspond to individual words in an utterance and extract features from the respective portions of audio using the encoder 1050. For example, a first feature vector may represent features of a first word of the utterance and a second feature vector may represent the features of a second word of the utterance. The feature vectors may be derived by spectral analysis of the input audio data.

The system(s) 120 processes (154) the feature vector using the trained model (determined during the training operations of FIG. 1A) to determine model output data. The trained model is trained using acoustic and lexical features to detect sentiment in audio data. The model output data may indicate a score or probability of utterance corresponding to one of four sentiment categories (e.g., anger, happiness, sadness, and neutral). The system(s) 120 determines (156), using the model output data, a sentiment category for the utterance. The sentiment categories may include broad categories such as positive, neutral, and negative. In other embodiments, the sentiment categories may be more specific and may include, for example, anger, happiness, sadness and neutral. In another embodiment, the sentiment categories may include anger, sad, happy, surprised, stress, and disgust. As can be appreciated, various sentiment categories/indicators are possible depending on the system configuration.

In some embodiments, the system(s) 120 may determine a first portion of the input audio data corresponding to a first word of the utterance and a second portion of the input audio data corresponding to a second word of the utterance. The system(s) 120 determines a first feature vector using the first portion of input audio data and a second feature vector using the second portion of the input audio data. The system(s) 120 processes the first and second feature vectors using the trained model to determine first and second model output data. The system(s) 120 may process the first and second model output data using another ML model (e.g., an attention model) to determine third model data. The system(s) 120 may determine the sentiment category using the third model data. The attention model may be configured to emphasize certain portions of the utterance by way of the third model data, which represents data corresponding to the first word and the second word of the utterance.

The input audio data may be captured by the device 110a and may include speech or sounds from the user 5 and/or speech and sounds from at least one other person. The device 110a may be in communication with a device 110b, and may send the input audio data to the device 110b. FIG. 1B shows device 110a as a smartwatch, however, device 110a may be any wearable device or any device carried by the user 5 and configured to capture audio data when the appropriate user permissions are met. The device 110b is shown as a smartphone, however, device 110b may be any mobile device or computing device such as a laptop, tablet, desktop, etc. that is in communication with the device 110a and configured to receive data from and send data to device 110a. Alternatively, the device 110a may be a voice-activated system or smart speaker, and may send input audio data directly to the system(s) 120 rather than forwarding via a device 110b. Alternatively the operations of devices 110a and 110b may be combined into a single device.

In some embodiments, the system(s) 120 may determine that the input audio data represents voice activity from a human. The system(s) 120 may identify a voice profile associated with a user profile of the device 110. The system(s) 120 may retrieve stored data associated with the user profile. The stored data may include a voice fingerprint or voice biomarker to identify a user using the audio data. In other embodiments, the stored data may include a RF data, location data, machine vision data, and the like described in connection with user recognition component 295. The system(s) 120 may identify the voice profile using the user recognition component 295 described herein.

The system(s) 120 may determine a first portion of the input audio data, where the first portion corresponds to the voice profile. For example, the input audio data may capture speech from multiple persons, especially if user 5 is conversing with another person. The system(s) 120 may isolate the first portion of the input audio data associated with speech spoken by user 5, and store the first portion for further analysis. The system(s) 120 may determine the feature vector (in operation 152) using the first portion of the input audio data.

The system(s) 120 stores (152) association data associating the sentiment category with the audio data frame and the user profile. In an example embodiment, the system(s) 120 may analyze input audio data during a period of time, and determine a sentiment category at various time intervals to provide the user information on his or her emotional state during the period of time or while interacting with other persons. In another embodiment, the system(s) 120 may analyze input audio data while the user interacts with the device 110, and the sentiment category may indicate the user's satisfaction with his or her interactions with the device 110.

The system(s) 120 may generate output data including at least the sentiment category and a portion of the input audio data. The system(s) 120 may determine text data corresponding to the audio data frame using the ASR processing techniques described below. The system(s) 120 may also determine time data indicating when the portion of the input audio data is received by the device 110. The output data may include the text data corresponding to the portion of input audio data, the time data, and an indicator of the sentiment category. The output data may be displayed on a user device 110a or the device 110b. The indicator of the sentiment category may be text representing the sentiment category, an icon representing the sentiment category, or other indicators.

The operations of FIG. 1B are generally described herein as being performed by the system(s) 120. However, it should be understood that one or more of the operations may also be performed by the device 110a, device 110b, or other device. Further details of the runtime operations are described in connection with FIG. 5.

The overall system of the present disclosure may operate using various components as illustrated below. The various components may be located on same or different physical devices. Communication between various components may occur directly or across a network(s) 199.

As shown in FIGS. 2A and 2B, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120 as shown in FIG. 2A. As shown in FIG. 2B, the device 110a may transmit audio data 211 to device 110b, and the device 110b may transmit audio data 211 to the system(s) 120. The audio data 211 may include data corresponding to the wakeword, or the portion of the audio corresponding to the wakeword may be removed by the device 110a prior to sending the audio data 211 to the system(s) 120. In some embodiments, the device 110a may begin transmitting audio data 211 to system(s) 120/device 110b (or otherwise performing further processing on audio data) in response to an event occurring or an event being detected by the device 110a.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user. The sentiment detection component 275 may be included in the speech processing component 240 or may be a separate component as illustrated in FIG. 2A. The sentiment detection component 275 and other components are generally described as being operated by the system(s) 120. However, the device 110 may also operate one or more of the components, including the sentiment detection component 275.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
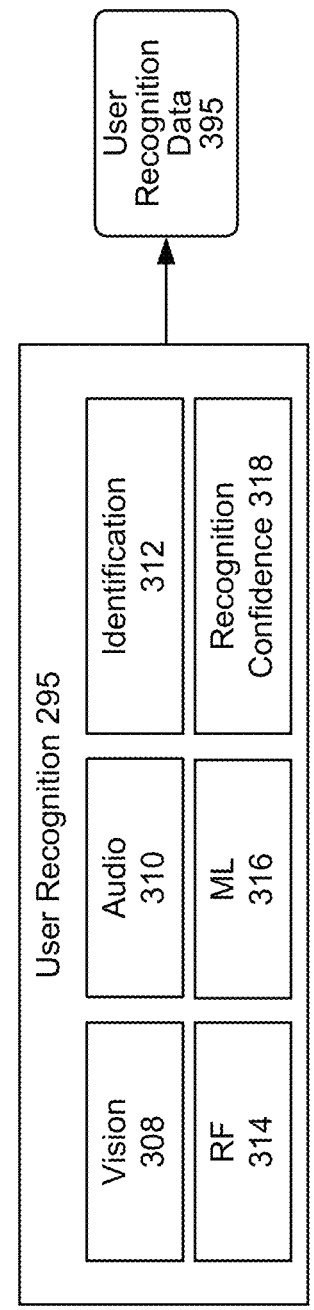
FIG. 3 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 3, the user recognition component 295 may include one or more subcomponents including a vision component 308, an audio component 310, a identification component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user that the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system 100 of the present disclosure may include biometric sensors that transmit data to the identification component 312. For example, the identification component 312 may receive data corresponding to fingerprints, iris or retina scans, thermal scans, weights of users, a size of a user, pressure (e.g., within floor sensors), etc., and may determine a profile corresponding to a user. The identification component 312 may distinguish between a user and sound from a television, for example. Thus, the identification component 312 may incorporate identification information into a confidence level for determining an identity of a user. Identification information output by the identification component 312 can be associated with specific user profile data such that the identification information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to satisfy or be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

As shown in FIG. 2B, the sentiment detection component 275 and the user recognition component 295 may be included in the device 110b. The device 110a may transmit audio data 211 to device 110b. Upon receipt, the device 110b may send the audio data 211 to the user recognition component 295 to perform the operations described herein in relation to component 295, for example, including identifying a user profile corresponding to the audio data 211. The user recognition component 295 may send data to the sentiment detection component 275 to perform operations described herein.

Figure 4:
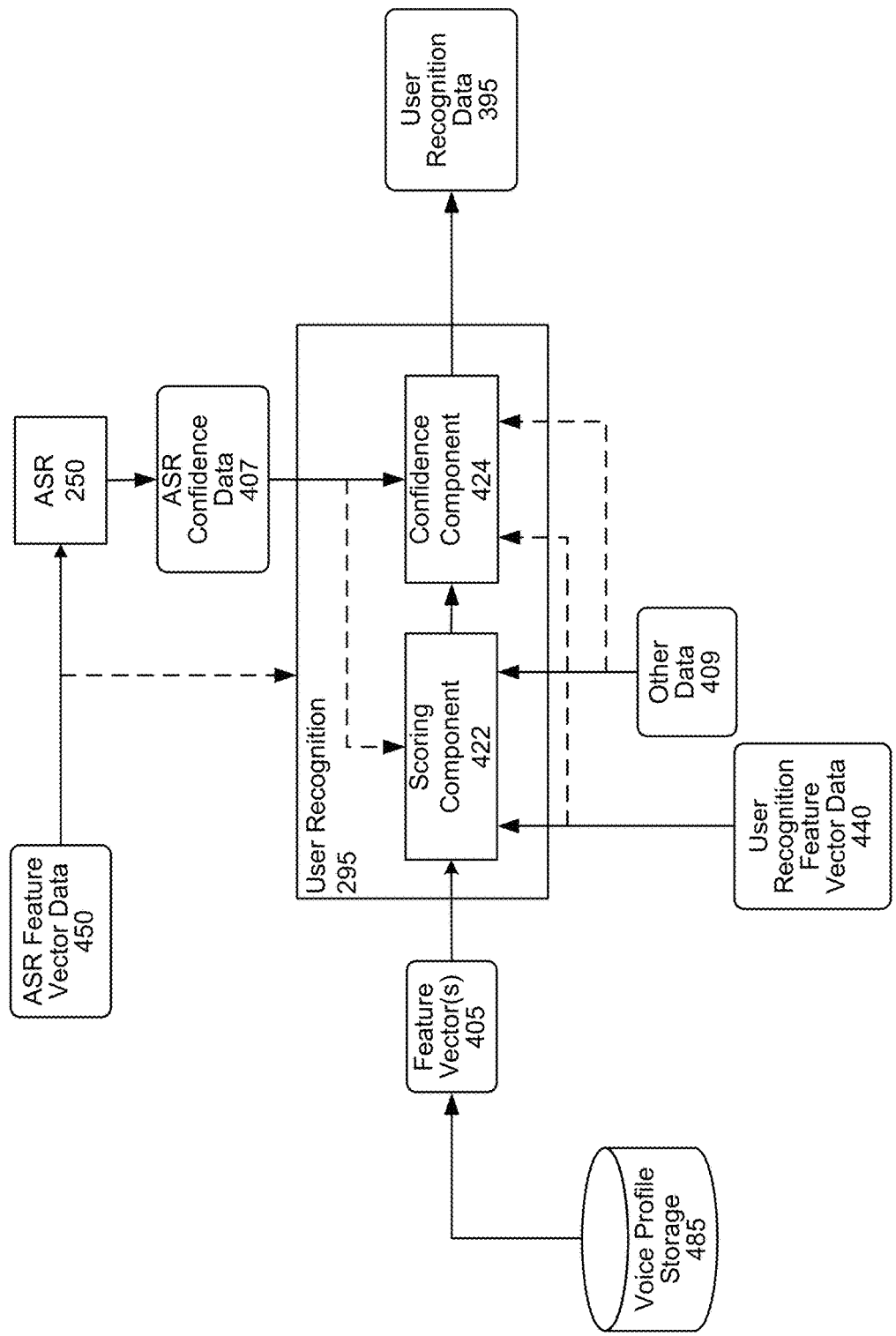
FIG. 4 is a system flow diagram illustrating user recognition according to embodiments of the present disclosure.

FIG. 4 illustrates user recognition processing as may be performed by the user recognition component 295. The ASR component 250 performs ASR processing on ASR feature vector data 450. ASR confidence data 407 may be passed to the user recognition component 295.

The user recognition component 295 performs user recognition using various data including the user recognition feature vector data 440, feature vectors 405 representing voice profiles of users of the system(s) 120, the ASR confidence data 407, and other data 409. The user recognition component 295 may output the user recognition data 395, which reflects a certain confidence that the user input was spoken by one or more particular users. The user recognition data 395 may include one or more user identifiers (e.g., corresponding to one or more voice profiles). Each user identifier in the user recognition data 395 may be associated with a respective confidence value, representing a likelihood that the user input corresponds to the user identifier. A confidence value may be a numeric or binned value.

The feature vector(s) 405 input to the user recognition component 295 may correspond to one or more voice profiles. The user recognition component 295 may use the feature vector(s) 405 to compare against the user recognition feature vector 440, representing the present user input, to determine whether the user recognition feature vector 440 corresponds to one or more of the feature vectors 405 of the voice profiles. Each feature vector 405 may be the same size as the user recognition feature vector 440.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 440 produced from the audio data 211. The user recognition component 295 may send a signal to voice profile storage 485, with the signal requesting only audio data and/or feature vectors 405 (depending on whether audio data and/or corresponding feature vectors are stored) associated with the device identifier, the group profile identifier, and/or the user identifiers represented in the metadata. This limits the universe of possible feature vectors 405 the user recognition component 295 considers at runtime and thus decreases the amount of time to perform user recognition processing by decreasing the amount of feature vectors 405 needed to be processed. Alternatively, the user recognition component 295 may access all (or some other subset of) the audio data and/or feature vectors 405 available to the user recognition component 295. However, accessing all audio data and/or feature vectors 405 will likely increase the amount of time needed to perform user recognition processing based on the magnitude of audio data and/or feature vectors 405 to be processed.

If the user recognition component 295 receives audio data from the voice profile storage 485, the user recognition component 295 may generate one or more feature vectors 405 corresponding to the received audio data.

The user recognition component 295 may attempt to identify the user that spoke the speech represented in the audio data 211 by comparing the user recognition feature vector 440 to the feature vector(s) 405. The user recognition component 295 may include a scoring component 422 that determines respective scores indicating whether the user input (represented by the user recognition feature vector 440) was spoken by one or more particular users (represented by the feature vector(s) 405). The user recognition component 295 may also include a confidence component 424 that determines an overall accuracy of user recognition processing (such as those of the scoring component 422) and/or an individual confidence value with respect to each user potentially identified by the scoring component 422. The output from the scoring component 422 may include a different confidence value for each received feature vector 405. For example, the output may include a first confidence value for a first feature vector 405a (representing a first voice profile), a second confidence value for a second feature vector 405b (representing a second voice profile), etc. Although illustrated as two separate components, the scoring component 422 and the confidence component 424 may be combined into a single component or may be separated into more than two components.

The scoring component 422 and the confidence component 424 may implement one or more trained machine learning models (such as neural networks, classifiers, etc.) as known in the art. For example, the scoring component 422 may use probabilistic linear discriminant analysis (PLDA) techniques. PLDA scoring determines how likely it is that the user recognition feature vector 440 corresponds to a particular feature vector 405. The PLDA scoring may generate a confidence value for each feature vector 405 considered and may output a list of confidence values associated with respective user identifiers. The scoring component 422 may also use other techniques, such as GMMs, generative Bayesian models, or the like, to determine confidence values.

The confidence component 424 may input various data including information about the ASR confidence 407, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 424 may also consider the confidence values and associated identifiers output by the scoring component 422. For example, the confidence component 424 may determine that a lower ASR confidence 407, or poor audio quality, or other factors, may result in a lower confidence of the user recognition component 295. Whereas a higher ASR confidence 407, or better audio quality, or other factors, may result in a higher confidence of the user recognition component 295. Precise determination of the confidence may depend on configuration and training of the confidence component 424 and the model(s) implemented thereby. The confidence component 424 may operate using a number of different machine learning models/techniques such as GMM, neural networks, etc. For example, the confidence component 424 may be a classifier configured to map a score output by the scoring component 422 to a confidence value.

The user recognition component 295 may output user recognition data 395 specific to a one or more user identifiers. For example, the user recognition component 295 may output user recognition data 395 with respect to each received feature vector 405. The user recognition data 395 may include numeric confidence values (e.g., 0.0-1.0, 0-1000, or whatever scale the system is configured to operate). Thus, the user recognition data 395 may output an n-best list of potential users with numeric confidence values (e.g., user identifier 123—0.2, user identifier 234—0.8). Alternatively or in addition, the user recognition data 395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 395 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 424 may determine the overall confidence value.

The confidence component 424 may determine differences between individual confidence values when determining the user recognition data 395. For example, if a difference between a first confidence value and a second confidence value is large, and the first confidence value is above a threshold confidence value, then the user recognition component 295 is able to recognize a first user (associated with the feature vector 405 associated with the first confidence value) as the user that spoke the user input with a higher confidence than if the difference between the confidence values were smaller.

The user recognition component 295 may perform thresholding to avoid incorrect user recognition data 395 being output. For example, the user recognition component 295 may compare a confidence value output by the confidence component 424 to a threshold confidence value. If the confidence value does not satisfy (e.g., does not meet or exceed) the threshold confidence value, the user recognition component 295 may not output user recognition data 395, or may only include in that data 395 an indicator that a user that spoke the user input could not be recognized. Further, the user recognition component 295 may not output user recognition data 395 until enough user recognition feature vector data 440 is accumulated and processed to verify a user above a threshold confidence value. Thus, the user recognition component 295 may wait until a sufficient threshold quantity of audio data of the user input has been processed before outputting user recognition data 395. The quantity of received audio data may also be considered by the confidence component 424.

The user recognition component 295 may be defaulted to output binned (e.g., low, medium, high) user recognition confidence values. However, such may be problematic in certain situations. For example, if the user recognition component 295 computes a single binned confidence value for multiple feature vectors 405, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 409 to inform user recognition processing. A trained model(s) or other component of the user recognition component 295 may be trained to take other data 409 as an input feature when performing user recognition processing. Other data 409 may include a variety of data types depending on system configuration and may be made available from other sensors, devices, or storage. The other data 409 may include a time of day at which the audio data 211 was generated by the device 110 or received from the device 110, a day of a week in which the audio data audio data 211 was generated by the device 110 or received from the device 110, etc.

The other data 409 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 440 and one or more feature vectors 405 to perform more accurate user recognition processing.

The other data 409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 409 may include data representing activity of a particular user that may be useful in performing user recognition processing. For example, a user may have recently entered a code to disable a home security alarm. A device 110, represented in a group profile associated with the home, may have generated the audio data 211. The other data 409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 409 and considered by the user recognition component 295.

Depending on system configuration, the other data 409 may be configured to be included in the user recognition feature vector data 440 so that all the data relating to the user input to be processed by the scoring component 422 may be included in a single feature vector. Alternatively, the other data 409 may be reflected in one or more different data structures to be processed by the scoring component 422.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
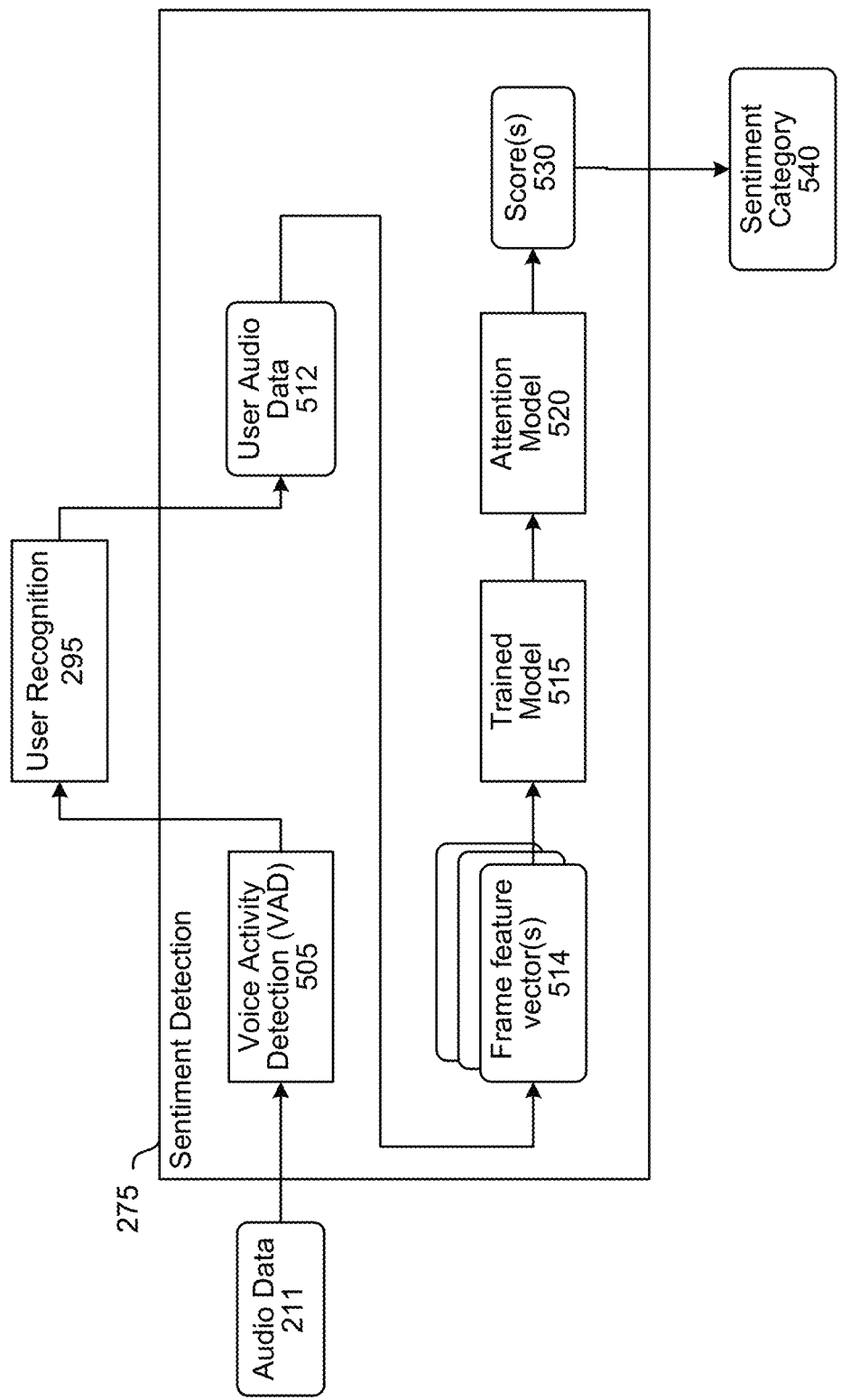
FIG. 5 is a conceptual diagram illustrating a sentiment detection component according to embodiments of the present disclosure.

FIG. 5 is a conceptual diagram illustrating a sentiment detection component according to embodiments of the present disclosure. The sentiment detection component 275 may include a voice activity detection (VAD) component 505, a trained model 515 and an attention model 520. The audio data 211 captured by a device 110 may be inputted into the VAD component 505. The sentiment detection component 275 may reside with a device 110a, with another device proximate to, and in communication with device 110 such as device 110b or with a remote device such as with system(s) 120. If the sentiment detection component 275 does not reside on the device 110a that is capturing audio, the sentiment detection component 275 may not necessarily include the VAD component 505 (or may not necessarily include other components) and may or may not include other components as well. The precise composition of the sentiment detection component 275 depends on system configuration.

The VAD component 505 may determine if the audio data 211 includes speech spoken by a human or voice activity by a human, and may determine a portion of the audio data 211 that includes speech or voice activity. The VAD component 505 may send the portion of the audio data 211 including speech or voice activity to the user recognition component 295. The VAD component 505 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 505 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the sentiment detection component 275) may communicate with the sentiment detection component 275 to determine user audio data 512 that corresponds to a particular user profile. The user recognition component 295 may recognize one or more users as described in connection with FIGS. 3 and 4. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets/satisfies a threshold. If the confidence level for a portion of the input audio data is below a threshold, then the respective portion of input audio is discarded as it does not represent speech from the user associated with the user profile. If the confidence level for a portion of the input audio data meets/satisfies a threshold, then the respective portion of the input audio data is stored as the user audio data 512.

The user audio data 512 may be a portion of the audio data 211 that includes speech or one or more utterances from a particular user associated with the user profile. In other words, audio data representing a particular user's speech may be isolated and stored as the user audio data 512 for further analysis. In an example embodiment, the user may be associated with or using the device 110, and may have provided permission to the system(s) 120 to record and analyze his or her voice/conversations to determine a sentiment category corresponding to the conversation.

Prior to performing further analysis on the user audio data 512, the sentiment detection component 275 may confirm that the user has granted permissions to analyze speech spoken by the user for sentiment detection.

The user audio data 512 may be inputted into an encoder 1050 (described further in relation to FIG. 10) to determine frame feature vector(s) 514. The frame feature vector(s) 514 may represent audio frame level features extracted from the user audio data 512. One frame feature vector 514 may represent features extracted for a window of 25 ms of audio, where the window slides or moves in increments of 10 ms to extract features represented by the next frame feature vector. In other embodiments, one frame feature vector 514 may represent features corresponding to an individual word in the utterance. The sentiment detection component 275 may determine the portions of user audio data 512 that correspond to individual words and extracts features from the respective portions of audio using the encoder 1050. The frame feature vector(s) 514 may be derived by spectral analysis of the user audio data 512.

In an example embodiment, the sentiment detection component 275 determines that the user audio data 512 includes an entire utterance. That is, the sentiment detection component 275 may determine that a beginpoint of the user audio data 512 corresponds to a beginpoint of an utterance, and an endpoint of the user audio data 512 corresponds to an endpoint of the utterance. In this case, the frame feature vectors 514 may represent the words in the entire utterance.

The trained model 515 may process the frame feature vector(s) 514 using a ML model trained according to the process and architecture described in connection with FIG. 6. The trained model 515 is trained on acoustic and lexical features and may be a combined sentiment detection model. Even though only acoustic features may be available during runtime for sentiment detection, the trained model 515 is configured to infer some semantic and contextual features learned from lexical information during training. The system for training the trained model 515 is described in further detail in connection with FIG. 6.

The trained model 515 may be a neural network, for example a bi-directional LSTM. The output of the trained model 515 may be fed into an attention model 520. The attention model 520 may be a neural network, for example a recurrent neural network, that is trained according to the process and architecture described in connection with FIG. 6. The attention model 520 may be configured to emphasize relevant portions of an input utterance. The attention model 520 may be configured to take in output data from the trained model 515 and produce an output for every time step (e.g., a 10 ms audio frame). The attention model 520 may be configured to aggregate information from different time intervals/audio frames of the input audio data to determine how certain parts of the utterance affects determining of the sentiment. For example, an acoustic representation of a first word in the utterance may indicate a high arousal implying anger, in which case the attention model 520 is configured to realize that the first word corresponds to an anger sentiment and that that should affect the processing of the other words in the utterance to ultimately determine a sentiment category corresponding to the utterance. In some embodiments, the functionality described here of the attention model 520 may be performed by one or more layers of the trained model 515. That is, the attention model 520 may be part of the trained model 515 and may not be a separate component from the trained model 515. One or more layers of the trained model 515 may be trained to perform the functionalities of the attention model 520.

The attention model 520 may output a score 530 indicating a likelihood of the utterance corresponding to a sentiment category 540. The attention model 520 may output model output data including an indicator of a sentiment or a N-best list of scores and corresponding sentiment category. The sentiment detection component 275 may predict from multiple sentiment categories, including but not limited to, happiness, sadness, anger and neutral. In an example embodiment, the sentiment category 540 may be determined after score(s) 530 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 540 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

Figure 11:
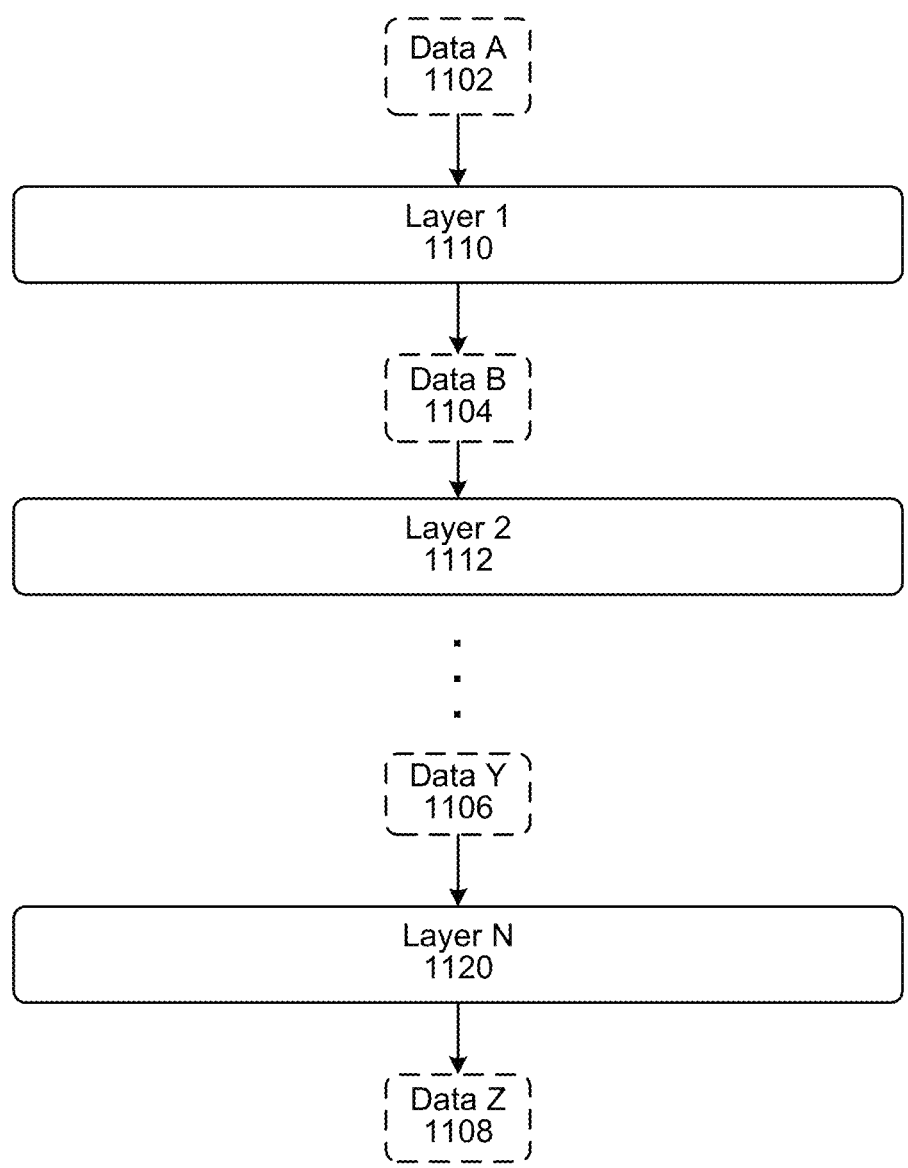
FIG. 11 is a conceptual diagram illustrating layers of a trained model according to embodiments of the present disclosure.

The trained model 515 may take many forms, including a neural network. The trained model 515 may employ a bi-directional LSTM. As illustrated in FIG. 11, a neural network may include a number of layers, from input layer 1 1110 through output layer N 1120. Each layer includes one or more nodes and is configured to input a particular type of data and output another type of data. A layer may be represented by a data structure that represents the connections between layers and operations within a layer. The neural network illustrated in FIG. 11 is configured to input data of type data A 1102 (which is the input to layer 1 1110) and output data of type data Z 1108 (which is the output from the last layer N 1120). The output from one layer is then taken as the input to the next layer. For example, the output data (data B 1104) from layer 1 1110 is the input data for layer 2 1112 and so forth such that the input to layer N 1120 is data Y 1106 output from the penultimate layer (not shown).

While values for the input data/output data of a particular layer are not known until a neural network is actually operating during runtime, the data describing the neural network describes the structure and operations of the layers of the neural network.

Figure 6:
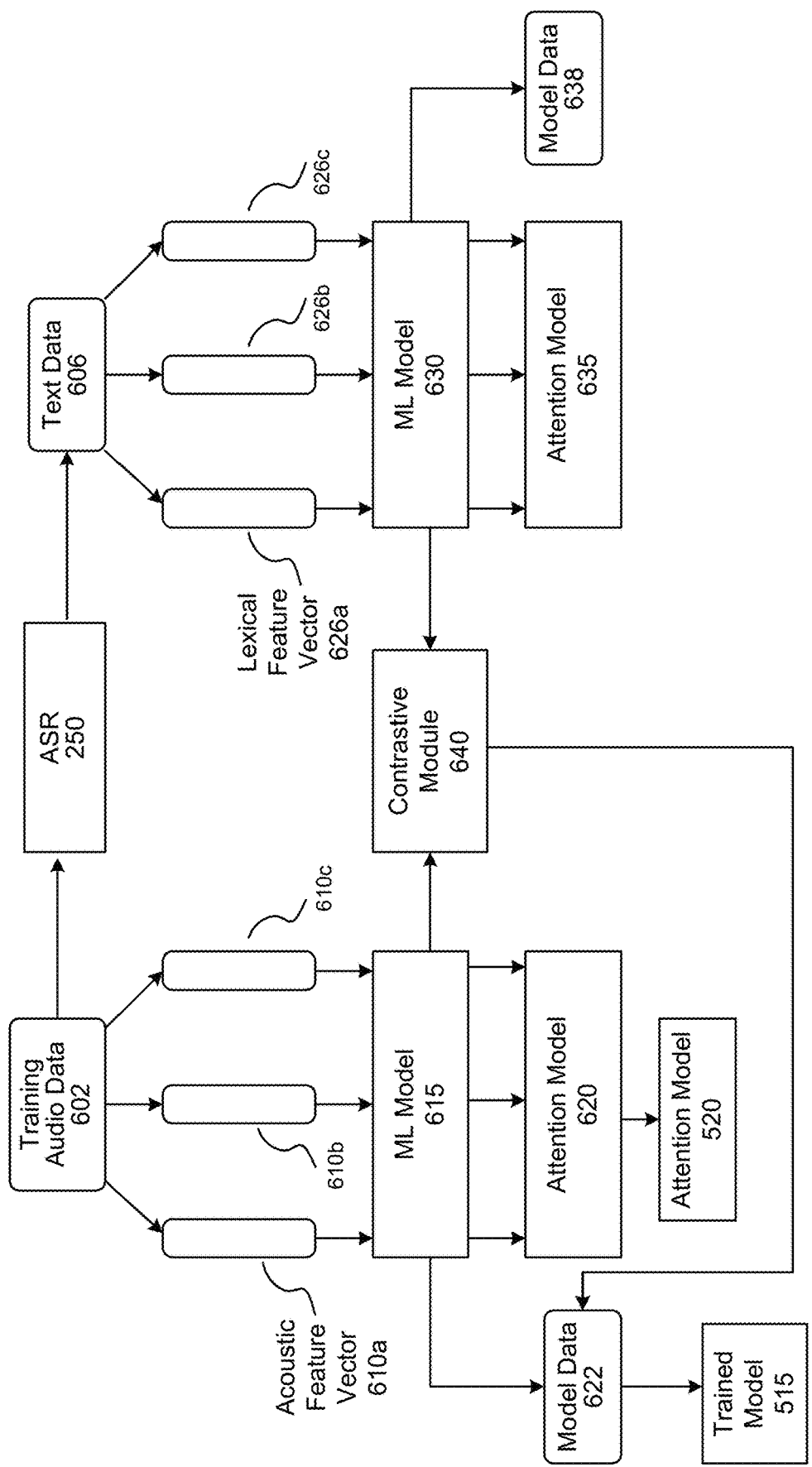
FIG. 6 is a conceptual diagram illustrating a system for training a model that may be used for sentiment detection according to embodiments of the present disclosure.

FIG. 6 is a conceptual diagram illustrating a system for training a model that may be used for sentiment detection according to embodiments of the present disclosure. The trained model 515 is trained on acoustic and lexical features, and thus is configured to infer some semantic information even though during runtime it only processes acoustic features corresponding to an utterance. The system trains two separate machine learning (ML) models (615 and 630) focused on different modalities. For example, ML model 615 is trained to process acoustic features derived from the training audio data 602, while ML model 630 is trained to process lexical features derived from text data 606 corresponding to the training audio data 602. The separate ML models 615 and 630 share their learned information with each other via the contrastive module 640.

The training audio data 602 may include audio representing utterances spoken by various users, and may have a variety of attributes caused by the users' emotions or sentiment (e.g., anger, happiness, neutral, sadness, etc.) while speaking the utterances. In an example embodiment, the utterances in the training audio data 602 may be annotated/labeled for the following sentiment categories: anger, happiness, neutral and sadness.

For an individual utterance represented in the training audio data 602, the system determines acoustic feature vectors 610 for each word in the utterance. One acoustic feature vector 610 may represent audio frame level features for audio representing one word of the utterance. The acoustic feature vector(s) 610 may be derived by spectral analysis of the training audio data 602. The training audio data 602 may be processed using speech recognition techniques (e.g., ASR component 250) to determine text data 606 representing the utterance in the training audio data 602. The system determines lexical feature vectors 626 for each word in the utterance using the text data 606. A lexical feature vector 626 may be a word embedding representing lexical features of the word as presented in the text data 606 and may be determined by a language model. The acoustic feature vector 610a may correspond to a first word in the utterance, and the lexical feature vector 626a may correspond to the same first word in the utterance.

Each of the ML models 615 and 630 may be neural networks, for example bi-directional LSTMs. The output of the ML model 615 may be fed into an attention model 620, and the output of the ML model 630 may be fed into an attention model 635. Each of the attention models 620 and 635 may be configured to emphasize relevant portions of the entire utterance. In an example embodiment, the attention model 620, 635 may be a recurrent neural network. The attention model 620, 635 may be configured to take in output data from the respective ML model 615, 630 and produce an output for every time step (e.g., a 10 ms audio frame). The attention model 620, 635 may be configured to aggregate information from different time intervals/audio frames of the training audio data and corresponding text data to determine how certain parts of the utterance affects determining of the sentiment. For example, a first word in the utterance may have a negative semantic (derived from the lexical feature vector) and the corresponding acoustic representation of the first word also indicates a high arousal implying anger, in which case the attention model 620, 635 is trained to realize that the first word corresponds to an anger sentiment and that should affect the processing of the other words in the utterance. In some embodiments, one or more layers of the ML model 615 may be trained to perform the functionalities of the attention model 620, and one or more layers of the ML model 630 may be trained to perform the functionalities of the attention model 635. That is, the attention models 620, 635 may be part of the ML models 615, 630 respectively and may not be a separate component from the ML models 615, 630.

The attention models 620, 635 may concentrate mass probability over the words that capture sentiment states along the sequence. Each of the attention models 620 and 635 may employ the following equations:

$$e_i = v^T \tanh(W_h h_i + b_h)$$

$$a_i = \frac{\exp(e_i)}{\sum_{j=1}^{N} \exp(e_j)},$$

$$\text{where } \sum_{i=1}^{N} a_i = 1$$

$$z = \sum_{i=1}^{N} a_i h_i$$

Equation 1 where $W_h \in \mathbb{R}^{d_a \times d_h}$ and $b_h \in \mathbb{R}^{d_h}$ are learnable parameters. The $v \in \mathbb{R}^{d_a}$ is the attention vector to be learned. Also, $d_a$ and $d_h$ are the dimensions of the attention layer and the hidden state, respectively. The scalars $a_i$ and their corresponding hidden vectors $h_i$ are multiplied to obtain the weighted sequence, and the sum of the resulting weighted vectors is z. The output (z) of the attention model 620, 625 may be processed to predict a sentiment category during training. The model weights and parameters learned by the attention model 620 during the training process is stored and used to determine the attention model 520 used during runtime.

The model data 622 may represent ML model weights and parameters for the acoustic view that are determined by processing the training audio data 602 using the ML model 615 and the attention model 620. The model data 638 may represent ML model weights and parameters for the lexical view that are determined by processing the text data 606 using the ML model 630 and the attention model 635.

Cross-entropy loss may measure the performance of a ML model whose output is a probability value between 0 and 1. The cross-entropy loss increases as the predicted probability diverges from the actual label of the training data. For example, predicting a probability of 0.012 when the actual observation label is 1 would result in a high loss value. A perfect model would have a cross-entropy loss of 0. The contrastive module 640 determines a loss value corresponding to the acoustic view ML model 615 and a loss value corresponding to the lexical view ML model 630. The contrastive module 640 also determines a contrastive loss value based on the comparison of the acoustic view loss value and the lexical view loss value. The contrastive module 640 updates the model data 622 using the lexical view loss value and/or the contrastive loss value, thus embedding a portion of the information/data learned by the lexical view/ML model 630 into the trained model 515.

For explanation purposes, consider the acoustic view as $V_a$ and the lexical view as $V_l$. Each view learns information about the sentiment represented in the utterance using its corresponding modality, for example data vectors $h_a$ and $h_l$, from the final layer of the respective ML models 615 and 630. These data vectors are used as positive samples of the triplets in the following contrastive loss function employed by the contrastive module 640:

$$L_c := \frac{1}{2N} \sum_{i}^{N} \max(0, m + dis(h_{a_i}, h_{l_i}^+) - dis(h_{a_i}, h_{l_i}^-)) +$$

$$\frac{1}{2N} \sum_{i}^{N} \max(0, m + dis(h_{l_i}, h_{a_i}^+) - dis(h_{l_i}, h_{a_i}^-))$$

Equation 2 where the + and − superscripts refer to positive and negative samples and dis is a distance function that calculates the similarity between two vectors. The system thus uses similar samples that are as close as possible and dissimilar ones that are as far as possible, forcing a margin of at least m for the negative samples. In some embodiments, the negative samples may be randomly chosen to force a different sentiment category and to force a different sentiment category that is acoustically similar to the positive sample (e.g., sadness vs. neutral, or anger vs. happiness).

The contrastive module 640 also employs the following cross-entropy loss functions for the lexical and acoustic views:

$$L_l := \frac{1}{N} \beta \sum_{i}^{N} \hat{y}_i \log(y_i)$$

$$L_a := \frac{1}{N} (1 - \beta) \sum_{i}^{N} \hat{y}_i \log(y_i)$$

Equation 3 where β calculated as a function of the number of training cycles executed to determine the trained model 515. A training cycle refers to processing of training audio data 602 using the components described in connection with FIG. 6 starting with the ML models 615 and 630 and ending with determining model data 622 and 638. In some embodiments, the acoustic view (ML model 615 and attention model 620) and the lexical view (ML model 630 and attention model 635) are executed in parallel to determine the respective model data 622 and 638.

In some embodiments, the weights and parameters of the ML model 630 representing the lexical view are not updated or changed based on the contrastive module 640. The ML model 630 may be trained separately using the text data 606, and the determined weights and parameters may be stored/frozen while the ML model 615 is trained. The ML model 630, as part of training, may output sentiment categories for utterances represented in the training text data 606. These sentiment categories determined/outputted by the ML model 630 may be used to evaluate/train the ML model 615 representing the acoustic view.

The system may configure and store trained model 515 using the weights and parameters represented in the model data 622. The trained model 515 is thus configured to process acoustic feature vectors and is trained to consider acoustic and lexical features to determine a sentiment category for an utterance.

Figure 7:
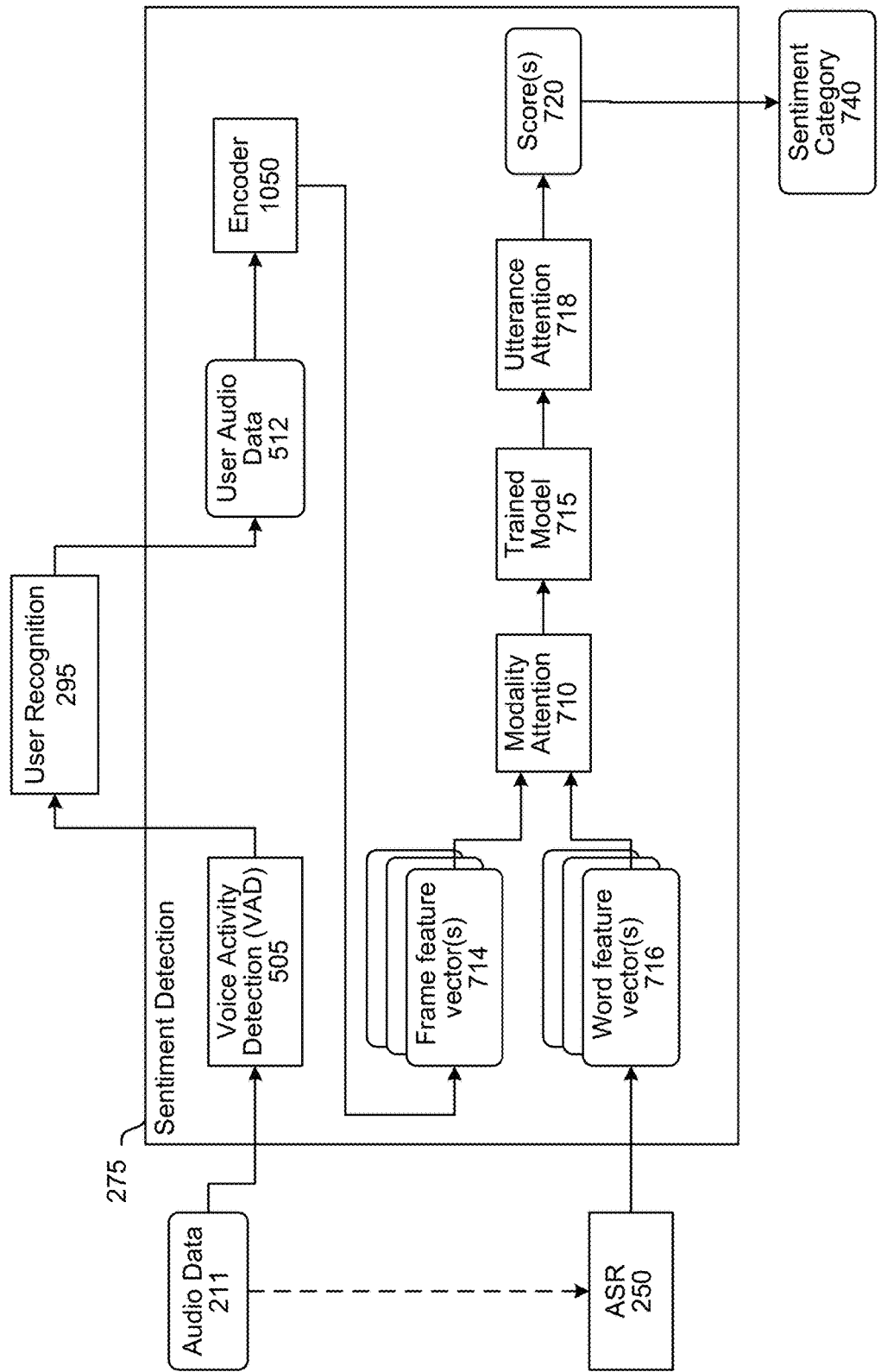
FIG. 7 is a conceptual diagram illustrating a sentiment detection component according to other embodiments of the present disclosure.

FIG. 7 is a conceptual diagram illustrating a sentiment detection component according to other embodiments of the present disclosure. In another embodiment, the sentiment detection component 275 may include a voice activity detection (VAD) component 505, a modality attention component 710, a trained model 715 and an utterance attention component 718. The audio data 211 captured by a device 110 may be inputted into the VAD component 505. The sentiment detection component 275 may reside with a device 110a, with another device proximate to, and in communication with device 110 such as device 110b or with a remote device such as with system(s) 120. If the sentiment detection component 275 does not reside on the device 110a that is capturing audio, the sentiment detection component 275 may not necessarily include the VAD component 505 (or may not necessarily include other components) and may or may not include other components as well. The precise composition of the sentiment detection component 275 depends on system configuration.

The VAD component 505 may be configured to perform the functionalities described above in connection with FIG. 5. The user recognition component 295 (which may be located on a same or different device as the sentiment detection component 275) may be configured to perform the functionalities described above in connection with FIG. 5.

The user audio data 512 may be a portion of the audio data 211 that includes speech or one or more utterances from a particular user associated with the user profile. In other words, audio data representing a particular user's speech may be isolated and stored as the user audio data 512 for further analysis. In an example embodiment, the user may be associated with or using the device 110, and may have provided permission to the system(s) 120 to record and analyze his or her voice/conversations to determine a sentiment category corresponding to the conversation.

Prior to performing further analysis on the user audio data 512, the sentiment detection component 275 may confirm that the user has granted permissions to analyze speech spoken by the user for sentiment detection.

The user audio data 512 may be inputted into an encoder 1050 (described further in relation to FIG. 10) to determine frame feature vector(s) 714. The encoder 1050 may be a bidirectional LSTM. The frame feature vector(s) 714 may represent audio frame level features extracted from the user audio data 512. One frame feature vector 714 may represent features corresponding to an individual word in the utterance. The sentiment detection component 275 may determine the portions of user audio data 512 that correspond to individual words and may extract acoustic features from the respective portions of audio using the encoder 1050. The frame feature vector(s) 714 may be derived by spectral analysis of the user audio data 512.

The ASR component 250, as described above, may generate an ASR output including text data representative of one or more utterances represented in the audio data 211. In some embodiments, the system sends audio data 211 to the ASR component 250 for processing. In other embodiments, the system sends user audio data 512 to the ASR component 250 for processing. The ASR output may be represented as word feature vectors 716, where each word feature vector 716 may correspond to a word in the text data determined by the ASR component 250 and may represent lexical information of the utterance. The word feature vector 716 may be a word embedding.

In an example embodiment, the sentiment detection component 275 determines that the user audio data 512 includes an entire utterance. That is, the sentiment detection component 275 may determine that a beginpoint of the user audio data 512 corresponds to a beginpoint of an utterance, and an endpoint of the user audio data 512 corresponds to an endpoint of the utterance. In this case, the frame feature vectors 714 and the word feature vectors 716 may represent all the words in one utterance.

The sentiment detection component 275 may align a frame feature vector 714 with a corresponding word feature vector 716 such that the pair represents acoustic information and lexical information, respectively, for an individual word in the utterance represented in user audio data 512. The frame feature vectors 714 and the word feature vectors 716 may be processed by the trained model 715 simultaneously.

The trained model 715 may process the frame feature vector(s) 714 and corresponding word feature vector(s) 716 using a ML model trained according to the process and architecture described in connection with FIG. 8. In some embodiments, the sentiment detection component 275 includes a modality attention component 710 configured to determine how much acoustic information versus how much lexical information from the respective feature vectors 714, 716 should be used by the trained model 715. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 710 may assign a weight or percentage to the data represented by the acoustic feature vectors and the data represented by the lexical feature vectors to indicate the importance of each to the trained model 715.

The trained model 715 may be a neural network, for example a bi-directional LSTM. The output of the trained model 715 may be fed into an utterance attention component 718. The utterance attention component 718 may employ a neural network, for example a recurrent neural network, that is trained according to the process and architecture described in connection with FIG. 6. The utterance attention component 718 may be configured to emphasize relevant portions of an input utterance. The utterance attention component 718 may be configured to take in output data from the trained model 715 and produce an output for every time step (e.g., a 10 ms audio frame). The utterance attention component 718 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 718 is configured to realize that the first word corresponds to an anger sentiment and that that should affect the processing of the other words in the utterance to ultimately determine a sentiment category corresponding to the utterance.

The utterance attention component 718 may output score 720 indicating a sentiment category 740 for the user audio data 512. The sentiment detection component 275 may predict from multiple sentiment categories, including but not limited to, happiness, sadness, anger and neutral. In an example embodiment, the sentiment category 740 may be determined after score(s) 720 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 740 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

The trained model 715 may take many forms, including a neural network. The trained model 715 may employ a bi-directional LSTM. As illustrated in FIG. 11, a neural network may include a number of layers, from input layer 1 1110 through output layer N 1120. Each layer includes one or more nodes and is configured to input a particular type of data and output another type of data. A layer may be represented by a data structure that represents the connections between layers and operations within a layer. The neural network illustrated in FIG. 11 is configured to input data of type data A 1102 (which is the input to layer 1 1110) and output data of type data Z 1108 (which is the output from the last layer N 1120). The output from one layer is then taken as the input to the next layer. For example, the output data (data B 1104) from layer 1 1110 is the input data for layer 2 1112 and so forth such that the input to layer N 1120 is data Y 1106 output from the penultimate layer (not shown).

While values for the input data/output data of a particular layer are not known until a neural network is actually operating during runtime, the data describing the neural network describes the structure and operations of the layers of the neural network.

Figure 8:
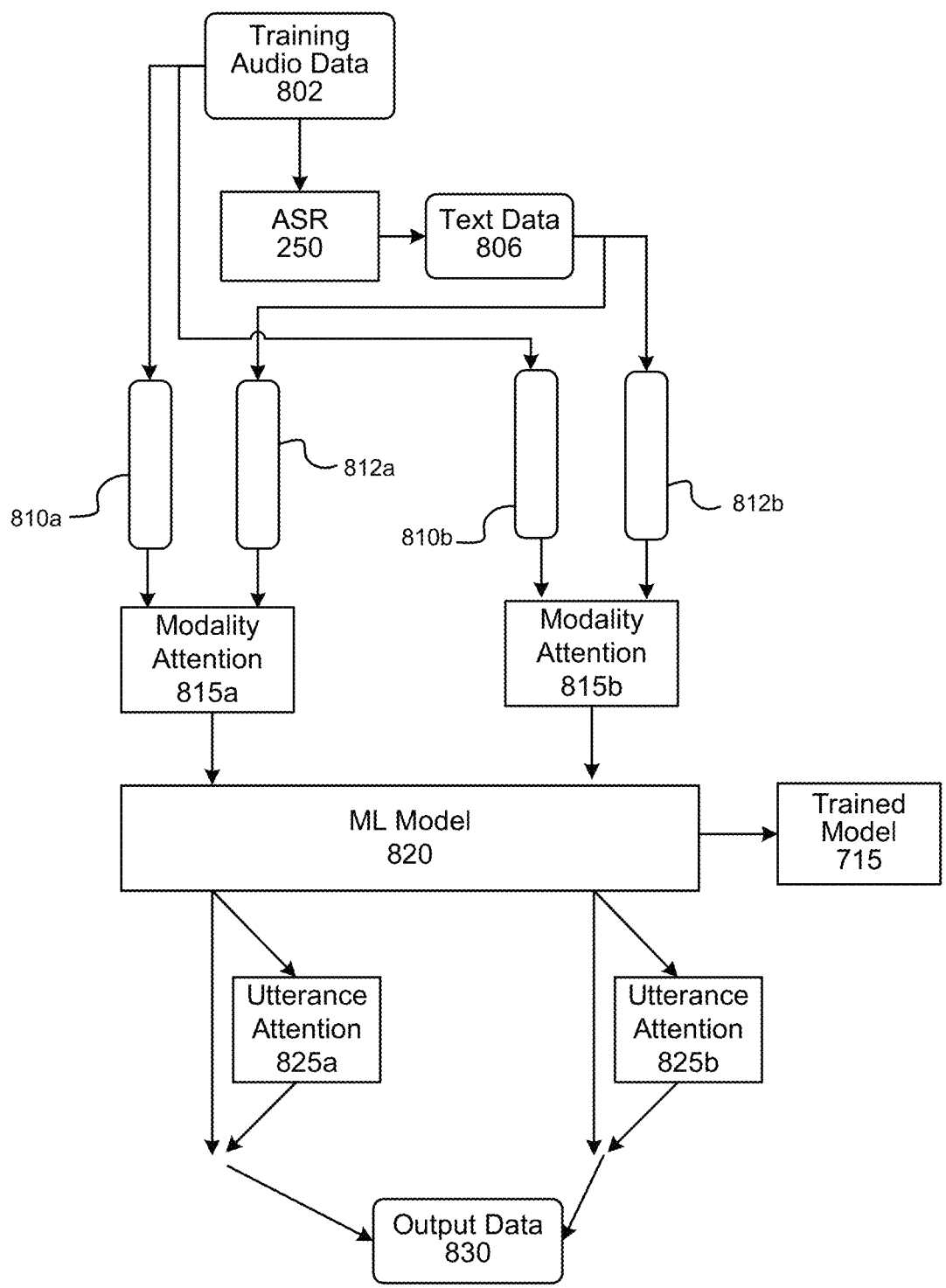
FIG. 8 is a conceptual diagram illustrating another system for training a model that may be used for sentiment detection according to embodiments of the present disclosure.

FIG. 8 is a conceptual diagram illustrating another system for training a model that may be used for sentiment detection according to embodiments of the present disclosure. The trained model 715 may be configured to process acoustic features and lexical features corresponding to an utterance to determine a sentiment category associated with the utterance.

The training audio data 802 may include audio representing utterances spoken by various users, and may have a variety of attributes caused by the users' emotions or sentiment (e.g., anger, happiness, neutral, sadness, etc.) while speaking the utterances. In an example embodiment, the utterances in the training audio data 802 may be annotated/labeled for the following sentiment categories: anger, happiness, neutral and sadness.

For an individual utterance represented in the training audio data 802, the system determines acoustic feature vectors 810 for each word in the utterance by processing the training audio data 802 using an encoder 1050 to extract audio frame level features from the training audio data 802. One acoustic feature vector 810 (e.g., 810a) may represent audio frame level features for audio representing one word of the utterance. The acoustic feature vector(s) 810 may be derived by spectral analysis of the training audio data 802. The training audio data 802 may be processed using speech recognition techniques (e.g., ASR component 250) to determine text data 806 representing the utterance in the training audio data 802. The system determines lexical feature vectors 812 for each word in the utterance using the text data 806. A lexical feature vector 812 may be a word embedding representing lexical features of the word as presented in the text data 806. The acoustic feature vectors 810 and the corresponding lexical feature vectors 812 may be aligned on a word-level and inputted to a modality attention component 815 simultaneously for processing. For example, the acoustic feature vector 810a may correspond to a first word in the utterance, and the lexical feature vector 812a may correspond to the same first word in the utterance.

The system trains the machine learning (ML) model 820 to combine acoustic and lexical information for sentiment recognition in audio data. The ML model 820 may be a neural network, for example, a bi-directional LSTM. The system may include a modality attention component 815 configured to prioritize one modality (acoustic or lexical) over the other at the word level. For example, when the lexical features are more relevant to capture sentiments (e.g., when informative words are used), the modality attention component 815 may prioritize the data represented by the lexical feature vector 812, and when the acoustic features are more relevant (e.g., arousal and pitch levels increase) the modality attention component 815 may prioritize the data represented by the acoustic feature vector 810. The modality attention component 815 may employ the following equations:

$$h_a = \tanh(W_a x_a + b_a)$$

$$h_l = \tanh(W_l x_l + b_l)$$

$$z = \sigma(W_z [x_a, x_l] + b_z)$$

$$h = z \times h_a + (1-z) \times h_l \qquad \text{Equation 4}$$

where $x_a$ and $x_l$ are the acoustic and lexical feature vectors, respectively. These feature vectors are concatenated ($[x_a, x_l]$) and multiplied by $W_z$ so that the concatenation can be projected in the same space of the hidden vectors $h_a$ and $h_l$. Then z is multiplied by the hidden acoustic vector $h_a$, (1−z) is multiplied by the hidden lexical vector $h_l$, and the sum of these represented as h incorporates a complementary mechanism over the modalities where prioritizing one of them is possible. The output of the modality attention component 815 is inputted in the ML model 820. The modality attention component 815 may employ a recurrent neural network. The model weights and parameters learned during the training process by the utterance attention component 825 may be stored and used to determine the model weights and parameters of the modality attention model 710.

The system may also include an utterance attention component 825 configured to emphasize relevant portions of the entire utterance. For example, the utterance attention component 825 may concentrate mass probability over the words that capture sentiment states along the sequence. The utterance attention component 825 may employ the following equations:

$$e_i = v^T \tanh(W_h h_i + b_h)$$ Equation 5

$$a_i = \frac{\exp(e_i)}{\sum_{j=1}^{N} \exp(e_j)},$$

where $\sum_{i=1}^{N} a_i = 1$ $$z = \sum_{i=1}^{N} a_i h_i$$

where $W_h \in R^{d_a \times d_h}$ and $b_h \in R^{d_h}$ are learnable parameters. The $v \in R^{d_a}$ is the attention vector to be learned. Also, $d_a$ and $d_h$ are the dimensions of the attention layer and the hidden state, respectively. The scalars $a_i$ and their corresponding hidden vectors $h_i$ are multiplied to obtain the weighted sequence, and the sum of the resulting weighted vectors is z. The output (z) of the utterance attention component 825 is processed (e.g., may be aggregated) to determine output data 830. The output data 830 may indicate a sentiment category for an utterance represented in the training audio data 802 that is predicted by processing the training audio data 802 using the modality attention component 815, the ML model 820 and the utterance attention component 825. The utterance attention component 825 may employ a recurrent neural network. The model weights and parameters learned during the training process by the utterance attention component 825 may be stored and used to determine the model weights and parameters of the utterance attention model 718. The system may configure and store the trained model 715 using the model weights and parameters learned during the training process by the ML model 820.

Figure 9:
FIG. 9 illustrates a visualization of how the system focuses attention on acoustic and lexical information according to embodiments of the present disclosure.

FIG. 9 illustrates a visualization of how the modality attention component 815 focuses attention on acoustic and lexical information. As described herein, the modality attention component 815 is configured to determine how much acoustic information versus how much lexical information is passed through the layers of the ML model 820. The modality attention component 815 may assign a weight or percentage to the data represented by the acoustic feature vectors and the data represented by the lexical feature vectors to indicate the importance of each to the ML model 820. For the modality attention component 815, the vector z from equation 5 determines how much acoustic information will go through the next layers, whereas (1−z) is the amount of lexical data allowed. Exemplary weights or percentages for exemplary words and utterances are illustrated in FIG. 9, where the small bars over the words ($w_1$-$w_{13}$) indicate the weight of each modality. The left bar above the word indicates, for example, how much importance the acoustic information will receive, and the right solid bar above the word indicates, for example, how much importance the lexical information will receive. For example, the first sample utterance 902, detected as corresponding to the sadness sentiment category, may include three words "$w_1$ $w_2$ $w_3$.". This utterance may be represented as ["$w_1$, acoustic_value1, lexical_value1], ["$w_2$", acoustic_value2, lexical_ value2], and [$w_3$, acoustic_value3, lexical_value3]. The words in this particular utterance could indicate different emotions/sentiments, but, as illustrated, the acoustic information (represented by the left bars) derived from the audio data mitigates the ambiguity. As another example, consider the third sample utterance 904 including words $w_1$-$w_{13}$ that is detected as corresponding to the happiness sentiment category. The third utterance may be "oh man I kissed Annie I've waited so long to do that." In some embodiments, contractions such as "I've" may be processed as two words (e.g., $w_6$, $w_7$). As shown, the acoustic information associated with "oh" ($w_1$) and "man" ($w_2$) receives more importance because the lexical information associated with "oh" and "man" could indicate many different emotions/sentiments. The lexical information associated with "kissed" ($w_4$) receives more importance because the meaning of the word indicates a particular emotion/sentiment.

FIG. 9 also illustrates how the attention model 520 and/or the utterance attention component 718 focuses on certain words within the utterance. The shading of certain words in FIG. 9 indicates the probabilities assigned by the attention model 520 and/or the utterance attention component 718, where the higher the probability the darker the shading. In some cases, where the utterances are long, the attention model 520 and/or the utterance attention component 825 can aid in emphasizing semantics associated with words as used in the utterance (contextual information derived from the entire utterance) that may not be available from the acoustic features.

Regarding the attention model 520 and/or the utterance attention component 718, FIG. 9 shows the words where the component 520/718 focuses along the utterance. For large-context utterances (e.g., 904), where the acoustic features are more or less similar across the entire utterance, the components 520/718 may help to emphasize specific words in the utterance based on how and when they appear within the utterance. For example, in the sample utterance 904, the attention model 520 and/or the utterance attention component 718 detects the semantics of words "kissed" ($w_4$) and "Annie" ($w_5$) and associates them with the words "so" ($w_9$) and "long" ($w_{10}$), and emphasizes them to aid in detecting the appropriate sentiment category associated with the utterance.

A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 10:
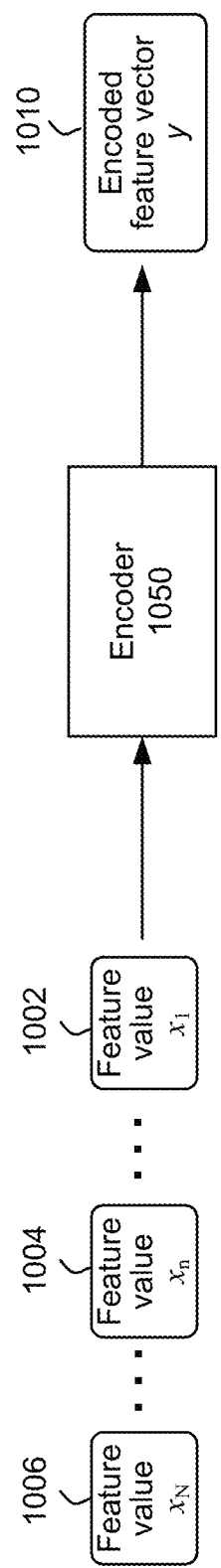
FIG. 10 illustrates operation of an encoder according to embodiments of the present disclosure.

FIG. 10 illustrates feature data values 1002-1006 being processed by an encoder 1050 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. Any particular encoder 1050 will be configured to output vectors of the same size, thus ensuring a continuity of output encoded vector size from any particular encoder 1050 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
 bi-linear, essentially the concatenation of a forward and a backward embedding, or
 tree, based on parse-tree of the sequence.

In addition, an attention model can be used, which is another RNN or DNN that learns to "attract" attention to certain parts of the input. The attention model can be used in combination with the above methods of consuming the input.

FIG. 10 illustrates operation of the encoder 1050. The input feature value sequence, starting with feature value $x_1$ 1002, continuing through feature value $x_n$ 1004 and concluding with feature value $x_N$ 1006 is input into the encoder 1050. The encoder 1050 may process the input feature values as noted above. The encoder 1050 outputs the encoded feature vector y 1010, which is a fixed length feature vector of length F. One or more encoders such as 1050 may be used with the sentiment detection component 275.

Figure 12:
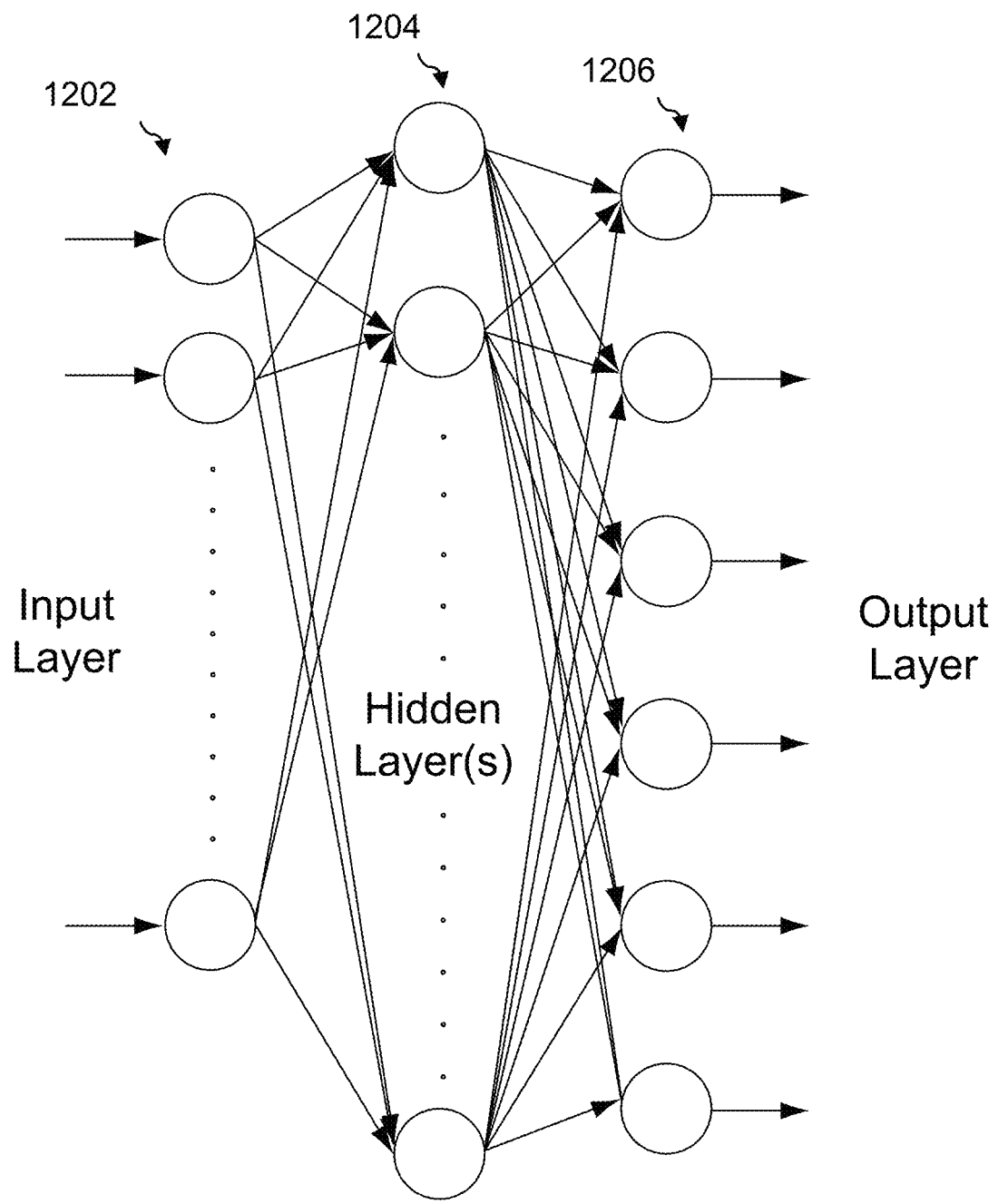
FIG. 12 illustrates a neural network such as one that may be used for sentiment detection according to embodiments of the present disclosure.

An example neural network for the trained model 515 is illustrated in FIG. 12. A neural network may be structured with an input layer 1202, middle layer(s) 1204, and an output layer 1206. The middle layer(s) may also be known as the hidden layer(s). Each node of the hidden layer is connected to each node in the input layer and each node in the output layer. Although illustrated in FIG. 12 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 13:
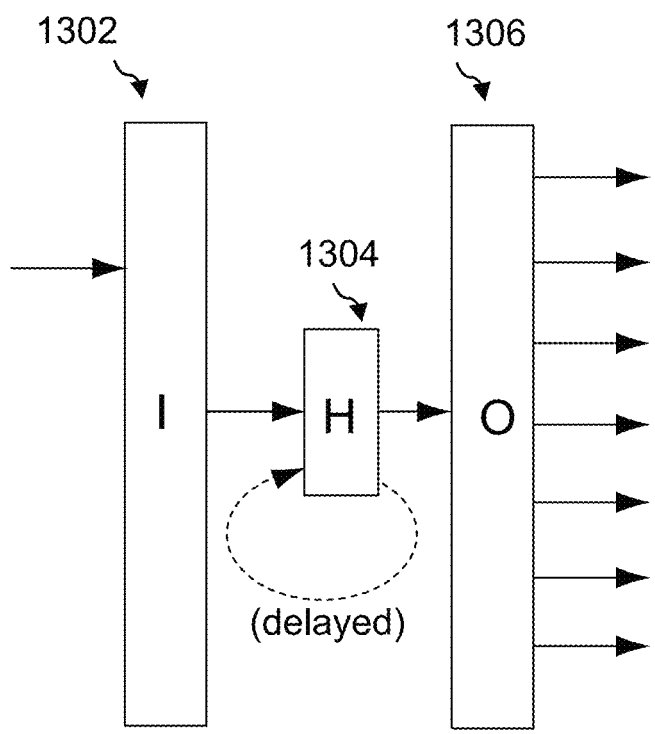
FIG. 13 illustrates a neural network such as one that may be used for sentiment detection according to embodiments of the present disclosure.

In one aspect, the neural network may be constructed with recurrent connections such that the output of the hidden layer of the network feeds back into the hidden layer again for the next set of inputs. Such a neural network is illustrated in FIG. 13. Each node of the input layer 1302 connects to each node of the hidden layer 1304. Each node of the hidden layer 1304 connects to each node of the output layer 1306. As illustrated, the output of the hidden layer 1304 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 13, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 14:
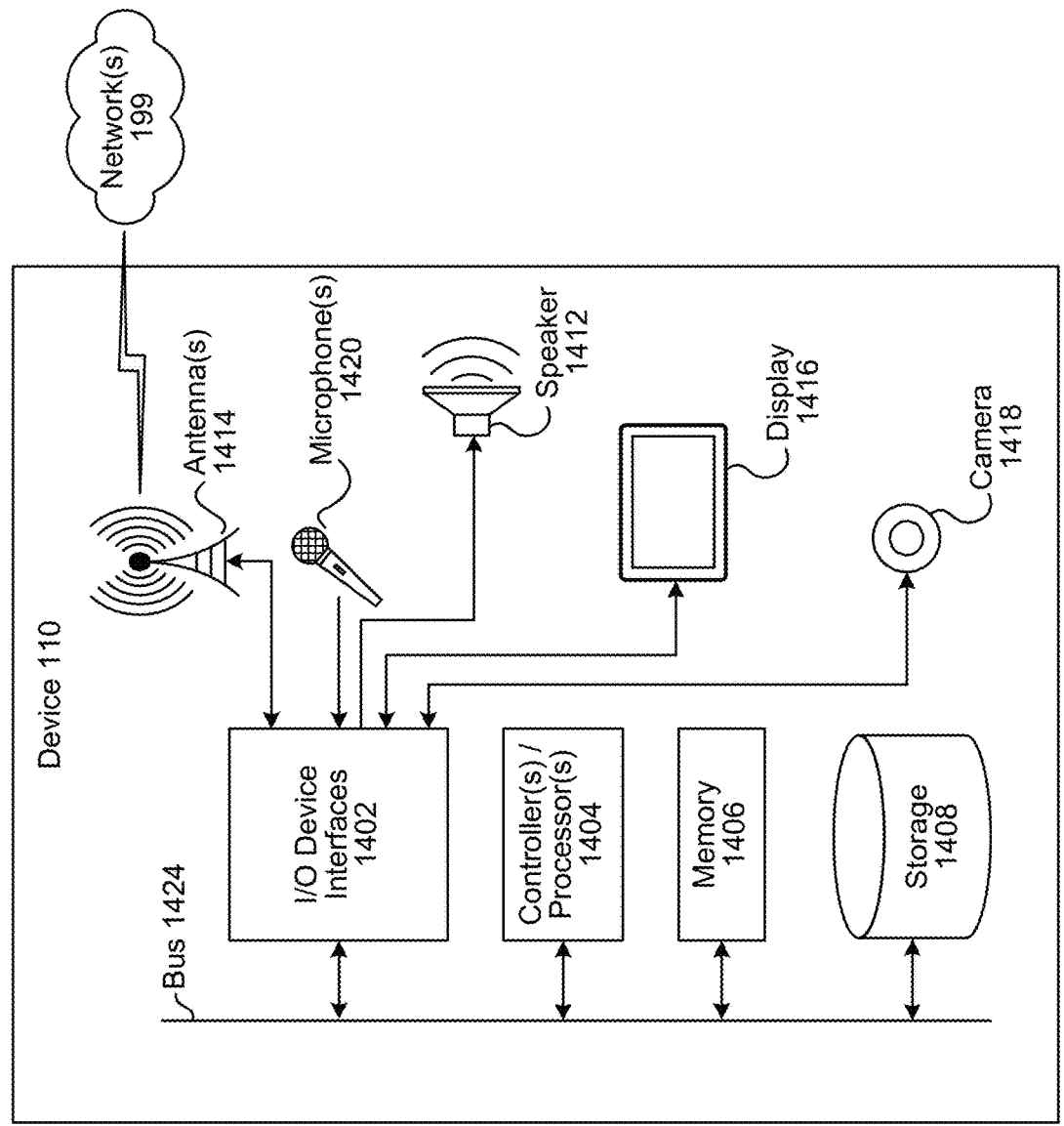
FIG. 14 is a block diagram conceptually illustrating example components of a device according to embodiments of the present disclosure.
Figure 15:
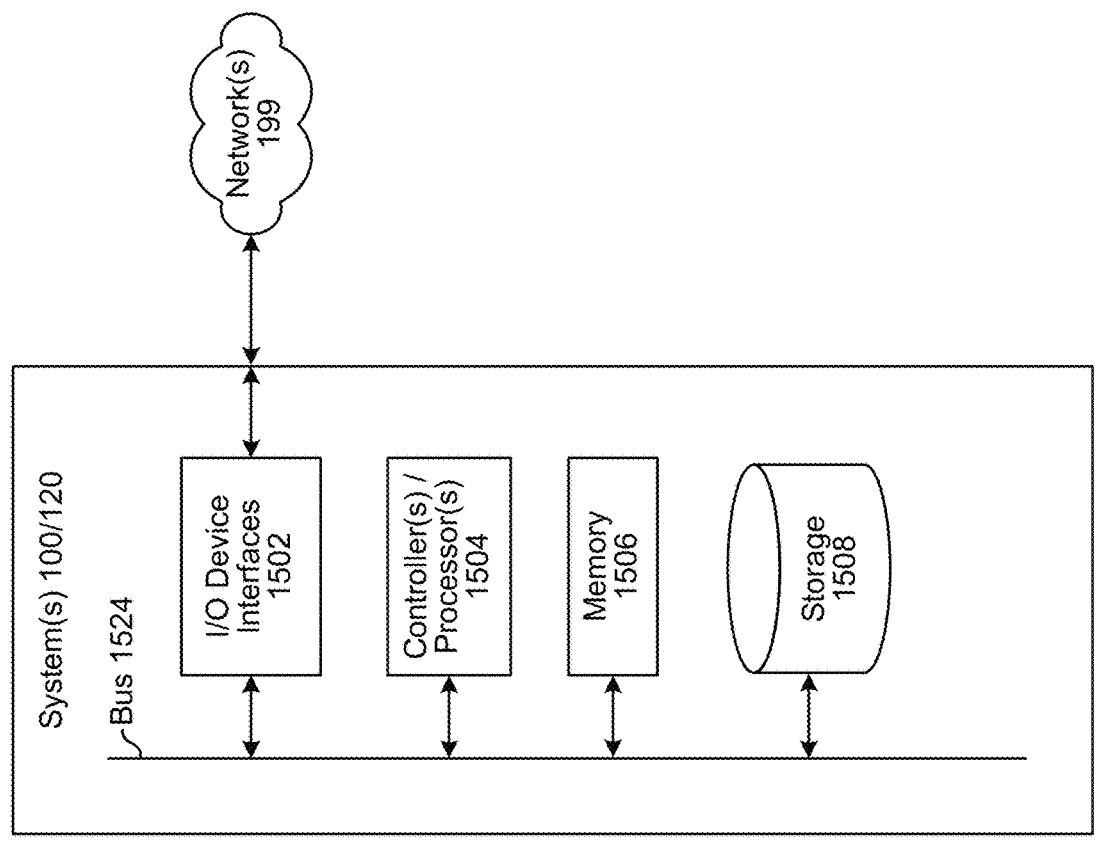
FIG. 15 is a block diagram conceptually illustrating example components of a server according to embodiments of the present disclosure.

FIG. 14 is a block diagram conceptually illustrating a device 110a and a device 110b that may be used with the system. FIG. 15 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (100/120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (100/110/120/225) may include one or more controllers/processors (1404/1504) which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (100/110/120/225) may also include a data storage component (1408/1508) for storing data and controller/processor-executable instructions. Each data storage component (1408/1508) may individually include one or more non-volatile storage types such as magnetic storage, optical storage, solid-state storage, etc. Each device (100/110/120/225) may also be connected to removable or external non-volatile memory and/or storage (such as a removable memory card, memory key drive, networked storage, etc.) through respective input/output device interfaces (1402/1502).

Computer instructions for operating each device (100/110/120/225) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (100/110/120/225) includes input/output device interfaces (1402/1502). A variety of components may be connected through the input/output device interfaces (1402/1502), as will be discussed further below. Additionally, each device (100/110/120/225) may include an address/data bus (1424/1524) for conveying data among components of the respective device. Each component within a device (100/110/120/225) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones 1420, a wired headset or a wireless headset (not illustrated), etc. If an array of microphones 1420 is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the I/O device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1402/1502) may also include communication components that allow data to be exchanged between devices such as different physical servers in a collection of servers or other components.

The components of the device(s) 110, the system(s) 100, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1402/1502), processor(s) (1404/1504), memory (1406/1506), and/or storage (1408/1508) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 100, the system(s) 120, and the skill system(s) 225, as described herein, are illustrative, and may be located as a stand-alone device or may be included, in whole or in part, as a component of a larger device or system.

Figure 16:
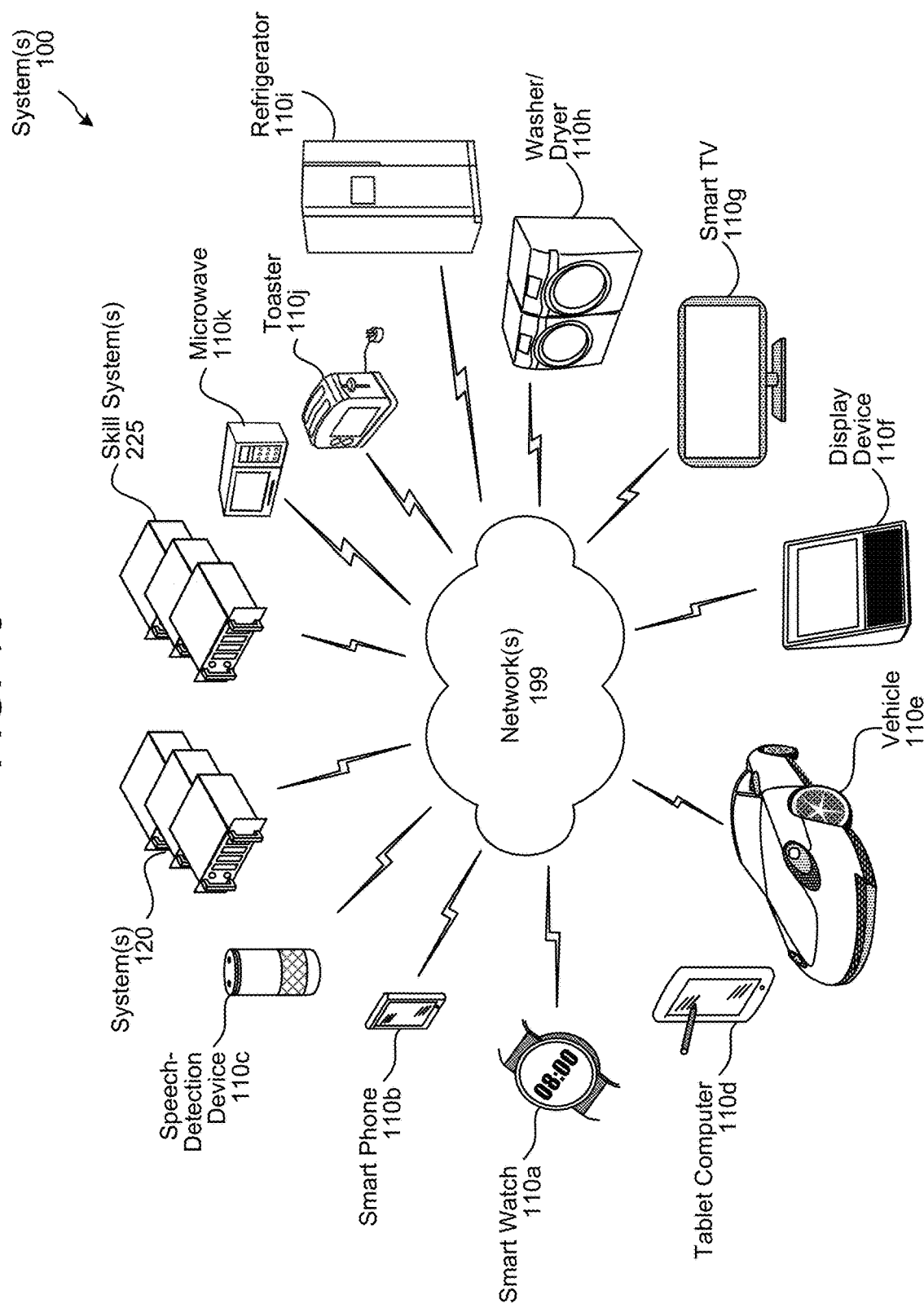
FIG. 16 illustrates an example of a computer network for use with the speech processing system.

As illustrated in FIG. 16, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a smart watch 110a, a smart phone 110b, a speech-detection device 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    during a first time period:
        receiving training audio data representing at least a first utterance and including an indication of a sentiment associated with the first utterance;
        determining an acoustic feature vector representing acoustic features of the training audio data;
        receiving text data representing the first utterance;
        determining a word embedding feature vector representing lexical features of the text data;
        determining, using the acoustic feature vector and the indication, an acoustic-based model configured to detect a sentiment category associated with audio data;
        determining, using the word embedding feature vector and the indication, a lexical-based model configured to detect a sentiment category associated with text data;
        determining, using the acoustic-based model and the lexical-based model, a combined sentiment detection model; and
        storing the combined sentiment detection model; and
    during a second time period after the first time period:
        receiving input audio data representing a second utterance;
        determining a first feature vector representing acoustic features of at least a portion of the input audio data; and
        determining, using the first feature vector and the combined sentiment detection model, a first sentiment category corresponding to the second utterance.

2. The computer-implemented method of claim 1, wherein determining the combined sentiment detection model comprises:
    determining a first loss value corresponding to the lexical-based model;
    determining a second loss value corresponding to the acoustic-based model;
    determining a third loss value based on a comparison of the first loss value and the second loss value; and
    determining the combined sentiment detection model using at least the third loss value.

3. The computer-implemented method of claim 1, further comprising, during the second time period:
    determining a first portion of the input audio data corresponding to a first word of the second utterance;

determining the first feature vector using the first portion;
processing the first feature vector using the combined sentiment detection model to determine first model output data;
determining a second portion of the input audio data corresponding to a second word of the second utterance;
determining a second feature vector using the second portion;
processing the second feature vector using the combined sentiment detection model to determine second model output data; and
determining, using the first model output data and the second model output data, the first sentiment category.

4. The computer-implemented method of claim 1, wherein receiving the input audio data comprises receiving the second utterance spoken by a first user and receiving a third utterance spoken by a second user, and the method further comprises:
determining a first confidence level that the second utterance corresponds to a user profile associated with the first user;
determining that the first confidence level satisfies a threshold;
storing a first portion of the input audio data corresponding to the second utterance as user audio data;
determining a second confidence level that the third utterance corresponds to the user profile;
determining that the second confidence level fails to satisfy the threshold;
discarding a second portion of the input audio data corresponding to the third utterance; and
determining the first feature vector using the first portion of the input audio data.

5. A computer-implemented method comprising:
receiving input audio data representing a first input;
determining a first portion of the input audio data corresponding to at least a first word of the first input;
determining first feature data representing acoustic features corresponding to the first portion of the input audio data;
determining, using a combined sentiment detection model and the first feature data, first model output data, wherein the combined sentiment detection model is trained using training audio data and training lexical data representing meaning of the training audio data;
determining a second portion of the input audio data corresponding to at least a second word of the first input;
determining second feature data using the second portion;
determining, using the combined sentiment detection model and the second feature data, second model output data; and
determining, using the first model output data and the second model output data, a sentiment corresponding to the first input.

6. The computer-implemented method of claim 5, further comprising:
determining text data corresponding to the first portion of the input audio data;
determining time data indicating when the first portion is received by a device;
generating output data including the text data, the time data, and an indicator of the sentiment; and
sending the output data to a device.

7. The computer-implemented method of claim 5, wherein receiving the input audio data comprises receiving the first input spoken by a first user and receiving a second input spoken by a second user, and the method further comprises:
determining that the first input corresponds to a user profile associated with the first user;
storing the first portion of the input audio data corresponding to the first input as user audio data;
determining that the second input does not correspond to the user profile; and
discarding a third portion of the input audio data corresponding to the second input.

8. The computer-implemented method of claim 5, further comprising prior to receiving the input audio data:
receiving the training audio data representing at least a second input;
determining acoustic features corresponding to the training audio data;
receiving the training lexical data representing at least the second input;
determining lexical features corresponding to the training lexical data;
determining an acoustic-based model using the acoustic features;
determining a lexical-based model using the lexical features; and
determining the combined sentiment detection model using the acoustic-based model and the lexical-based model.

9. The computer-implemented method of claim 8, further comprising:
determining a first loss value corresponding to the acoustic-based model;
determining a second loss value corresponding to the lexical-based model;
determining a third loss value based on a comparison of the first loss value and the second loss value; and
determining the combined sentiment detection model using at least the third loss value.

10. The computer-implemented method of claim 8, further comprising:
processing the training audio data using automatic speech recognition (ASR) processing to determine ASR output data corresponding to at least the second input;
determining, using the ASR output data, first lexical feature data corresponding to a third word of the second input and second lexical feature data corresponding to a fourth word of the second input; and
determining the lexical features using the first lexical feature data and the second lexical feature data.

11. A system comprising:
at least one processor; and
at least one memory including instructions that, when executed by the at least one processor, cause the system to:
receive input audio data representing a first input by a first user and a second input by a second user;
determine that a first portion of the input audio data corresponds to a user profile associated with the first user;
determine that a second portion of input audio data does not correspond to the user profile;
discard the second portion of the input audio data;
determine first feature data representing acoustic features corresponding to the first portion of the input audio data; and
determine, using a combined sentiment detection model, the first feature data, a sentiment corresponding to the first input, wherein the combined sentiment detection model is trained using training audio data and training lexical data representing meaning of the training audio data.

12. The system of claim 11, wherein the first feature data corresponds to a first word of the first input, and wherein the at least one memory includes further instructions, when executed by the at least one processor, cause the system to:
process the first feature data using the combined sentiment detection model to determine first model output data;
determine a third portion of the input audio data corresponding to a second word of the first input;
determine second feature data using the third portion;
process the second feature data using the combined sentiment detection model to determine second model output data; and
determine, using the first model output data and the second model output data, the sentiment.

13. The system of claim 11, wherein the at least one memory includes further instructions, when executed by the at least one processor, cause the system to:
determine text data corresponding to the first portion of the input audio data;
determine time data indicating when the first portion is received by a device;
generate output data including the text data, the time data, and an indicator of the sentiment; and
send the output data to a device.

14. The system of claim 11, wherein the at least one memory includes further instructions, when executed by the at least one processor, cause the system to prior to receiving the input audio data:
receive the training audio data representing at least a second input;
determine acoustic features corresponding to the training audio data;
receive the training lexical data representing at least the second input;
determine lexical features corresponding to the training lexical data;
determine an acoustic-based model using the acoustic features;
determine a lexical-based model using the lexical features; and
determine the combined sentiment detection model using the acoustic-based model and the lexical-based model.

15. The system of claim 14, wherein the at least one memory includes further instructions, when executed by the at least one processor, cause the system to:
determine a first loss value corresponding to the acoustic-based model;
determine a second loss value corresponding to the lexical-based model;
determine a third loss value based on a comparison of the first loss value and the second loss value; and
determine the combined sentiment detection model using at least the third loss value.

16. The system of claim 14, wherein the at least one memory includes further instructions, when executed by the at least one processor, cause the system to:
process the training audio data using automatic speech recognition (ASR) processing to determine ASR output data corresponding to at least the second input;
determine, using the ASR output data, first lexical feature data corresponding to a first word of the second input and second lexical feature data corresponding to a second word of the second input; and
determine the lexical features using the first lexical feature data and the second lexical feature data.

17. The computer-implemented method of claim 5, further comprising:
determining, using automatic speech recognition (ASR) processing and at least the first portion of the input audio data, ASR output data; and
processing, using the combined sentiment detection model, the first feature data and the ASR output data to determine the first model output data.

18. The system of claim 12, wherein the at least one memory includes further instructions, when executed by the at least one processor, cause the system to:
determine, using automatic speech recognition (ASR) processing and at least the first portion of the input audio data, ASR output data; and
process, using the combined sentiment detection model, the first feature data and the ASR output data to determine the first model output data.

* * * * *